United States Patent
Murata et al.

(10) Patent No.: US 11,782,147 B2
(45) Date of Patent: Oct. 10, 2023

(54) RADAR APPARATUS AND VEHICLE

(71) Applicant: PANASONIC INTELLECTUAL PROPERTY MANAGEMENT CO., LTD., Osaka (JP)

(72) Inventors: Tomohiro Murata, Kanagawa (JP); Hidekuni Yomo, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/070,026

(22) Filed: Nov. 28, 2022

(65) Prior Publication Data
US 2023/0091178 A1    Mar. 23, 2023

Related U.S. Application Data

(63) Continuation of application No. 16/814,595, filed on Mar. 10, 2020, now Pat. No. 11,543,511.

(30) Foreign Application Priority Data

Mar. 11, 2019    (JP) .................. 2019-043775
Sep. 11, 2019    (JP) .................. 2019-165429

(51) Int. Cl.
*G01S 13/04*    (2006.01)
*B60N 2/00*    (2006.01)
*G01S 13/68*    (2006.01)

(52) U.S. Cl.
CPC .............. *G01S 13/04* (2013.01); *B60N 2/002* (2013.01); *G01S 13/68* (2013.01)

(58) Field of Classification Search
CPC .......... G01S 13/04; G01S 13/68; B60N 2/002
USPC .......................................................... 342/27
See application file for complete search history.

(56) References Cited

U.S. PATENT DOCUMENTS

| | | | | |
|---|---|---|---|---|
| 6,318,697 B1 * | 11/2001 | Corrado | .................. | B60R 1/12 248/549 |
| 7,147,246 B2 * | 12/2006 | Breed | ................. | B60R 21/0152 280/739 |
| 7,476,861 B2 * | 1/2009 | Yajima | ................ | B60R 21/0154 250/336.1 |

(Continued)

FOREIGN PATENT DOCUMENTS

| DE | 102009042509 | | 3/2010 | | |
|---|---|---|---|---|---|
| DE | 102009042509 | A1 * | 3/2010 | ........... | H01Q 25/008 |

(Continued)

OTHER PUBLICATIONS

English translation of Japanese Office Action dated Dec. 13, 2022 issued in Japanese patent application No. 2019-165429.

*Primary Examiner* — Nuzhat Pervin
(74) *Attorney, Agent, or Firm* — GREENBLUM & BERNSTEIN, P.L.C.

(57) ABSTRACT

An object detection apparatus in a vehicle is provided. The object detection apparatus includes one or more sensors configured to detect at least one object located on at least three rows of seats in the vehicle, the one or more sensors being positioned on a ceiling of the vehicle. The object detection apparatus further includes a circuit configured to determine whether or not the at least one object detected is a living-object. A number of the one or more sensors is less than a number of the at least three rows of seats.

17 Claims, 35 Drawing Sheets

(56) References Cited

U.S. PATENT DOCUMENTS

| | | | | |
|---|---|---|---|---|
| 7,738,678 | B2* | 6/2010 | Breed | G06V 40/10 |
| | | | | 382/103 |
| 8,314,742 | B2* | 11/2012 | Fujita | H01Q 25/008 |
| | | | | 342/368 |
| 8,604,932 | B2* | 12/2013 | Breed | B60R 21/0132 |
| | | | | 340/576 |
| 8,725,311 | B1* | 5/2014 | Breed | A61B 5/11 |
| | | | | 701/1 |
| 8,830,114 | B2* | 9/2014 | Yasue | G01S 13/04 |
| | | | | 340/552 |
| 10,115,029 | B1* | 10/2018 | Day | G06V 20/59 |
| 10,240,948 | B2* | 3/2019 | Honda | G01D 5/2417 |
| 10,398,342 | B2* | 9/2019 | Tupin, Jr. | G01S 13/88 |
| 10,985,471 | B2* | 4/2021 | Shiozaki | H01Q 3/34 |
| 2003/0184065 | A1* | 10/2003 | Breed | B60R 21/0153 |
| | | | | 280/735 |
| 2004/0129478 | A1* | 7/2004 | Breed | G01S 17/88 |
| | | | | 180/273 |
| 2005/0168383 | A1* | 8/2005 | Lee | H01Q 1/245 |
| | | | | 343/846 |
| 2005/0248136 | A1* | 11/2005 | Breed | B60R 21/0152 |
| | | | | 280/742 |
| 2006/0092080 | A1* | 5/2006 | Lee | H01Q 9/0471 |
| | | | | 343/700 MS |
| 2006/0180764 | A1* | 8/2006 | Yajima | B60R 21/01534 |
| | | | | 701/45 |
| 2006/0186651 | A1* | 8/2006 | Aoki | B60R 1/00 |
| | | | | 280/735 |
| 2007/0105264 | A1* | 5/2007 | Tsurume | H01L 27/1214 |
| | | | | 438/62 |
| 2007/0114292 | A1* | 5/2007 | Breed | B60H 1/00842 |
| | | | | 165/203 |
| 2007/0285233 | A1* | 12/2007 | Inomata | H01Q 21/29 |
| | | | | 340/552 |
| 2008/0036580 | A1* | 2/2008 | Breed | G07C 5/0808 |
| | | | | 340/438 |
| 2008/0119993 | A1* | 5/2008 | Breed | G08G 1/166 |
| | | | | 701/45 |
| 2008/0195261 | A1* | 8/2008 | Breed | B60R 11/0241 |
| | | | | 701/2 |
| 2008/0236275 | A1* | 10/2008 | Breed | G01S 15/87 |
| | | | | 73/290 V |
| 2008/0255731 | A1* | 10/2008 | Mita | B60R 21/01538 |
| | | | | 701/45 |
| 2012/0194377 | A1* | 8/2012 | Yukumatsu | G01S 7/28 |
| | | | | 342/368 |
| 2012/0235850 | A1* | 9/2012 | Yasue | G01S 13/56 |
| | | | | 342/28 |
| 2013/0172771 | A1* | 7/2013 | Muhlsteff | B60R 25/1004 |
| | | | | 600/534 |
| 2014/0097957 | A1* | 4/2014 | Breed | G08B 21/06 |
| | | | | 340/576 |
| 2015/0085116 | A1* | 3/2015 | Graumann | B60R 11/04 |
| | | | | 348/148 |
| 2015/0268336 | A1* | 9/2015 | Yukumatsu | G01S 13/32 |
| | | | | 342/175 |
| 2017/0307415 | A1* | 10/2017 | Honda | B60N 2/7094 |
| 2017/0346177 | A1* | 11/2017 | Nagata | H01Q 21/065 |
| 2018/0050575 | A1* | 2/2018 | Campbell | G01N 33/004 |
| 2018/0079322 | A1* | 3/2018 | Tanriover | B60R 21/01512 |
| 2018/0266876 | A1* | 9/2018 | Carmon | G02B 27/106 |
| 2019/0092189 | A1* | 3/2019 | Moenkemueller | |
| | | | | B60R 21/01516 |
| 2019/0101636 | A1* | 4/2019 | Trotta | G01S 7/41 |
| 2019/0126779 | A1* | 5/2019 | Saitou | G01S 13/04 |
| 2019/0129019 | A1* | 5/2019 | Osawa | B06B 1/0622 |
| 2019/0152346 | A1* | 5/2019 | Kim | B60Q 9/00 |
| 2019/0232974 | A1* | 8/2019 | Reiley | G06V 20/597 |
| 2019/0235048 | A1* | 8/2019 | Lim | G01S 13/32 |
| 2019/0270483 | A1* | 9/2019 | Han | B62D 15/024 |
| 2019/0344712 | A1* | 11/2019 | Moffa | B60N 2/242 |
| 2020/0010091 | A1* | 1/2020 | Matsuura | B60W 40/09 |
| 2020/0011967 | A1* | 1/2020 | Iizuka | G01S 13/42 |
| 2020/0209377 | A1* | 7/2020 | Ogura | G01S 13/08 |
| 2020/0282979 | A1* | 9/2020 | Kim | B60W 40/09 |
| 2020/0312063 | A1* | 10/2020 | Balakrishnan | G08B 13/19697 |
| 2020/0327344 | A1* | 10/2020 | Nakagawa | G06T 7/00 |
| 2023/0091178 | A1* | 3/2023 | Murata | H01Q 21/06 |
| | | | | 342/27 |

FOREIGN PATENT DOCUMENTS

| | | | |
|---|---|---|---|
| JP | 08-127264 | 5/1996 | |
| JP | 09-066796 | 3/1997 | |
| JP | 2018-202921 | 12/2018 | |
| WO | 2012/042636 | 4/2012 | |
| WO | WO-2012042636 A1 * | 4/2012 | G01S 13/04 |
| WO | 2018/101082 | 6/2018 | |
| WO | WO-2018101082 A1 * | 6/2018 | G01S 13/003 |

* cited by examiner

RADAR APPARATUS AND VEHICLE

CROSS REFERENCE TO RELATED APPLICATIONS

This application is a Continuation of U.S. patent application Ser. No. 16/814,595, filed on Mar. 10, 2020, which in turn claims the benefit of Japanese Patent Applications No. 2019-043775, filed on Mar. 11, 2019, and No. 2019-165429, filed on Sep. 11, 2019. The disclosure of each of these documents, including the specifications, drawings and claims, is incorporated herein by reference in its entirety.

TECHNICAL FIELD

The present disclosure relates to a radar apparatus and a vehicle.

BACKGROUND ART

Sensors for detecting occupants in passenger compartments of motor vehicles have been under development in recent years to improve safety of the motor vehicles. Such sensors are used for air bag control or automated driving control, for example. In recent years, sensors for detecting children left behind in passenger compartments of vehicles have also been proposed.

PTL 1 discloses an occupant detection sensor that is embedded in a seat cushion and/or a headrest of a seat to detect the presence or absence of an occupant in the seat to control an auxiliary apparatus on the basis of detection information.

CITATION LIST

Patent Literature

{P67360 05480070.DOC}
PTL 1
Japanese Patent Application Laid-Open No. H8-127264

SUMMARY OF INVENTION

One non-limiting and exemplary embodiment of the present disclosure facilitates providing an improved radar apparatus and vehicle in which sensors can be installed at reduced cost.

In one general aspect, the techniques disclosed here feature a radar apparatus according to the present disclosure includes: an antenna configured to radiate a first electromagnetic wave in a first radiation angle range including a first direction and radiates a second electromagnetic wave in a second radiation angle range including a second direction opposite to the first direction; and a circuit configured to detect a first target in the first direction and a second target in the second direction on the basis of a first reflected signal of the first electromagnetic wave and a second reflected signal of the second electromagnetic wave, the first reflected signal and the second reflected signal being received by the antenna.

It should be noted that general or specific aspects may be implemented as a system, an apparatus, a method, an integrated circuit, a computer program, or a recording medium, or may be implemented as any selective combination of a system, an apparatus, a method, an integrated circuit, a computer program, and a recording medium.

According to a non-limiting and exemplary embodiment of the present disclosure, it is possible to provide an improved radar apparatus and vehicle in which sensors can be installed at reduced cost.

Additional benefits and advantages of non-limiting and exemplary embodiments of the present disclosure will become apparent from the specification and drawings. The benefits and/or advantages may be individually provided by some embodiments and features of the specification and drawings, which need not all be provided in order to obtain one or more identical features.

DESCRIPTION OF EMBODIMENTS

Among sensors, millimeter-wave radars are contactless and thus have advantages of high flexibility of installation and, in addition, being less susceptible to heat or external light. With the use of multiple-input-multiple-output (MIMO) technology that uses multiple antennas for transmission and reception, millimeter-wave radars can improve target search performance.

In an existing radar apparatus, however, electromagnetic beams are radiated in one direction. The term "one direction", as used herein, refers to a range of ±90° relative to the normal to a surface of the radar apparatus, and splitting an electromagnetic beam into two or more beams within this range is also included in radiation in "one direction". Therefore, it is difficult for an existing radar apparatus to emit electromagnetic beams forward and backward.

For example, to simultaneously detect a front-seat occupant and a rear-seat occupant of a vehicle, at least two radar apparatuses need to be used in combination, and spaces for installation are difficult to maintain in seats.

For example, in the related-art technique disclosed in PTL 1, the radiation direction of electromagnetic beams from a radar apparatus is one direction, and a plurality of sensors each detect a single occupant. Thus, to detect all occupants, a large number of sensors are necessary, and it is difficult to reduce the installation cost of the sensors.

The following describes embodiments of the present disclosure in detail with reference to the drawings. The following embodiments are examples, and the present disclosure is not limited to the following embodiments.

Embodiment 1

Figure 1:
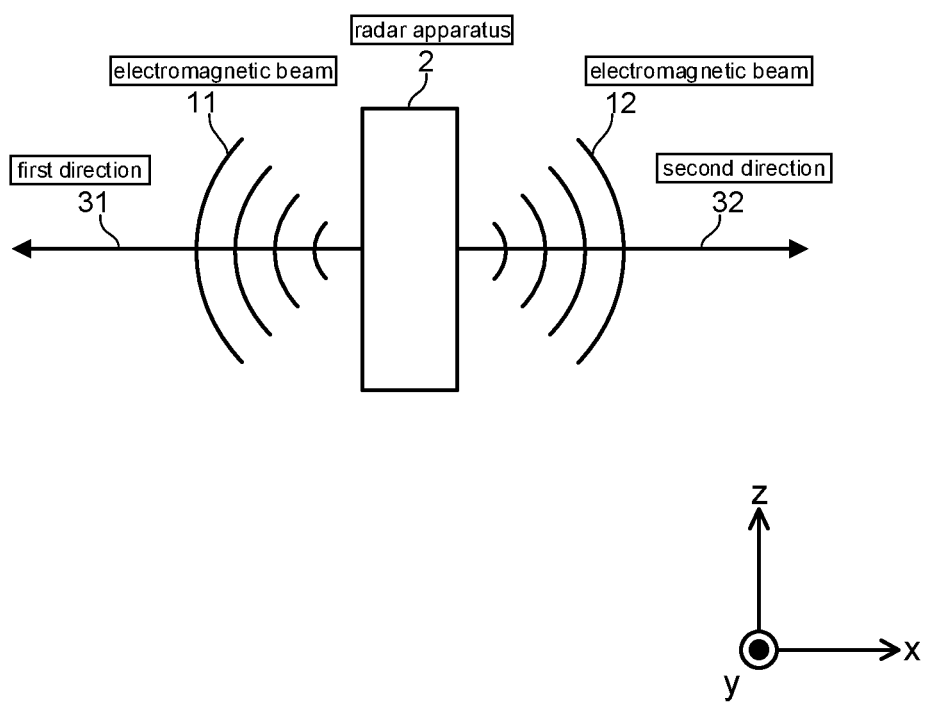
FIG. 1 is a schematic sectional view of a radar apparatus according to Embodiment 1.
Figure 2A:
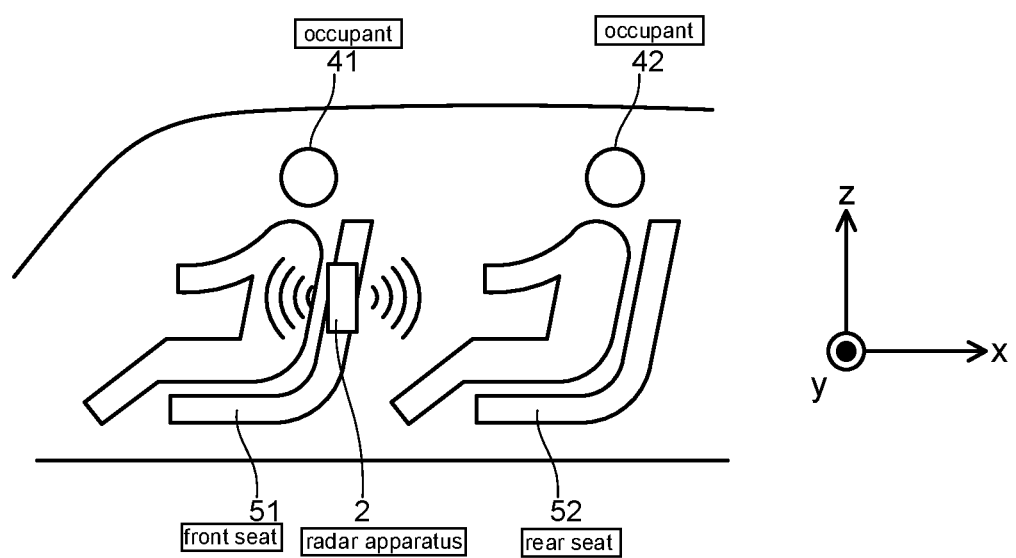
FIG. 2A is a diagram illustrating an example of attachment of the radar apparatus according to Embodiment 1 to a vehicle.

FIG. 1 is a schematic sectional view of radar apparatus 2 according to Embodiment 1. FIG. 2A is a diagram illustrating an example of attachment of radar apparatus 2 according to Embodiment 1 to a vehicle. As illustrated in FIG. 2A, radar apparatus 2 is attached to a backrest portion of front seat 51 of the vehicle. For example, one of first direction 31 and second direction 32 is directed in the forward direction of the vehicle, and the other direction is directed in the backward direction of the vehicle.

Radar apparatus 2 detects whether occupants 41 and 42 are present in seat (front seat) 51 and seat (rear seat) 52, respectively. In the following, detection may be interchangeably referred to as sensing or measurement. Radar apparatus 2 radiates electromagnetic beam (first electromagnetic wave, first radar signal) 11 and electromagnetic beam (second electromagnetic wave, second radar signal) 12 in two opposite directions (first direction 31 and second direction 32) with radar apparatus 2 interposed therebetween, respectively. In an example, electromagnetic beam 11 and electromagnetic beam 12 are radiated simultaneously. The angle formed by first direction 31 and second direction 32 is any value in the range of 90° to 270°. For example, when the angle is 180°, electromagnetic beam 12 and electromagnetic beam 11 are respectively radiated in the positive and negative directions along the x axis. The radiation angle range of electromagnetic beam 11 includes first direction 31. The radiation angle range of electromagnetic beam 12 includes second direction 32. In an example, the radiation angle range of electromagnetic beam 11 and the radiation angle range of electromagnetic beam 12 do not intersect.

The present disclosure is hereinafter described, taking an example in which seat 51 and seat 52 are front seat 51 and rear seat 52 disposed in the passenger compartment of the vehicle, respectively. However, in the present disclosure, seat 51 and seat 52 may be disposed in an indoor space of a mobile object other than a vehicle, for example, an airplane or a ship, or may be disposed in an indoor space of a building other than a mobile object, for example, a movie theater or a restaurant. Further, seat 51 and seat 52 may be installed in the same orientation or in different orientations. For example, seat 51 and seat 52 may be installed back-to-back.

Radar apparatus 2 radiates electromagnetic beams 11 and 12 forward and backward, respectively, to distinguishably detect occupant 41 in front seat 51 and occupant 42 in rear seat 52.

Figure 2B:
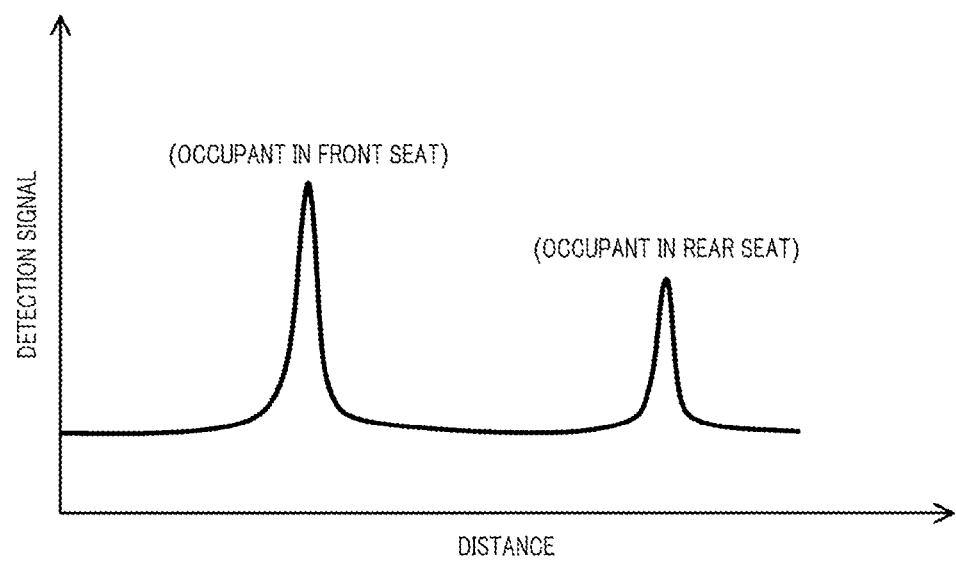
FIG. 2B is a diagram illustrating an example of a detection signal obtained by the radar apparatus according to Embodiment 1.

FIG. 2B is a diagram illustrating an example of a detection signal obtained by radar apparatus 2 according to Embodiment 1. The detection signal illustrated in FIG. 2B includes a reflected signal from occupant 41 in front seat 51 and a reflected signal from occupant 42 in rear seat 52.

In an example, occupant 41 in front seat 51 and occupant 42 in rear seat 52 are different distances from radar apparatus 2. For example, when radar apparatus 2 is installed at the position illustrated in FIG. 2A, occupant 41 in front seat 51 is closer to radar apparatus 2 than occupant 42 in rear seat 52. In this case, radar apparatus 2 can distinguishably detect a reflected wave (reflected signal) from occupant 41 in front seat 51 and a reflected wave (reflected signal) from occupant 42 in rear seat 52. When the distance between radar apparatus 2 and occupant 41 in front seat 51 and the distance between radar apparatus 2 and occupant 42 in rear seat 52 are substantially the same, radar apparatus 2 may output electromagnetic beams 11 and 12 at different timings.

After the vehicle is parked or during parking of the vehicle, a radar is activated for several minutes. If the complex signal component of a detection signal at each distance does not fluctuate under influence other than noise, no occupant (moving object) is considered to be present in the passenger compartment.

On the other hand, for example, when an occupant is sleeping in a vehicle during parking of the vehicle, a periodic and regular vibration due to the breathing and heartbeat of the occupant can be detected by a radar apparatus as a change in complex signal component. Accordingly, as a result of the observation of the complex signal component of a detection signal within a predetermined distance, if no periodic and regular vibration component is detected, the radar apparatus determines that no occupant is present in the vehicle.

In an example, a signal processing circuit (not illustrated) connected to radar chip 8 (see FIG. 3A) stores in a memory element (memory) in advance reflected signals received in absence of occupants 41 and 42.

In an example, the signal processing circuit (not illustrated) connected to radar chip 8 (see FIG. 3A) stores in the memory element (memory) in advance reflected signals received when occupants 41 and 42 are determined to be absent, as reference values.

Then, at the time of detection by radar apparatus 2, the signal processing circuit (not illustrated) connected to radar chip 8 determines whether occupants 41 and 42 are present in seats 51 and 52, respectively, on the basis of received reflected signals and the reflected signals which are stored reference values. This allows radar apparatus 2 to more accurately detect whether occupants 41 and 42 are present, compared with when the reflected signals being the stored reference values are not used.

In an example, radar apparatus 2 has a function of a Doppler sensor and detects, in addition to the distances to plural occupants 41 and 42, the respective movements of plural occupants 41 and 42. For example, as a result of detecting a movement resulting from at least one of the body movement, heartbeat, and breathing of plural occupants 41 and 42, plural occupants 41 and 42 can be more reliably detected. When a vehicle equipped with radar apparatus 2 is at a standstill, the vibration of the vehicle is weaker than during movement, and radar apparatus 2 is able to more accurately detect a fine movement of plural occupants 41 and 42. Accordingly, for example, radar apparatus 2 can also be used as an in-vehicle left-behind warning sensor for detecting a child left behind in any one of front seat 51 and rear seat 52 during parking. The term "standstill" is used to include both a standstill without the engine idling and a standstill with the engine idling.

Figure 3A:
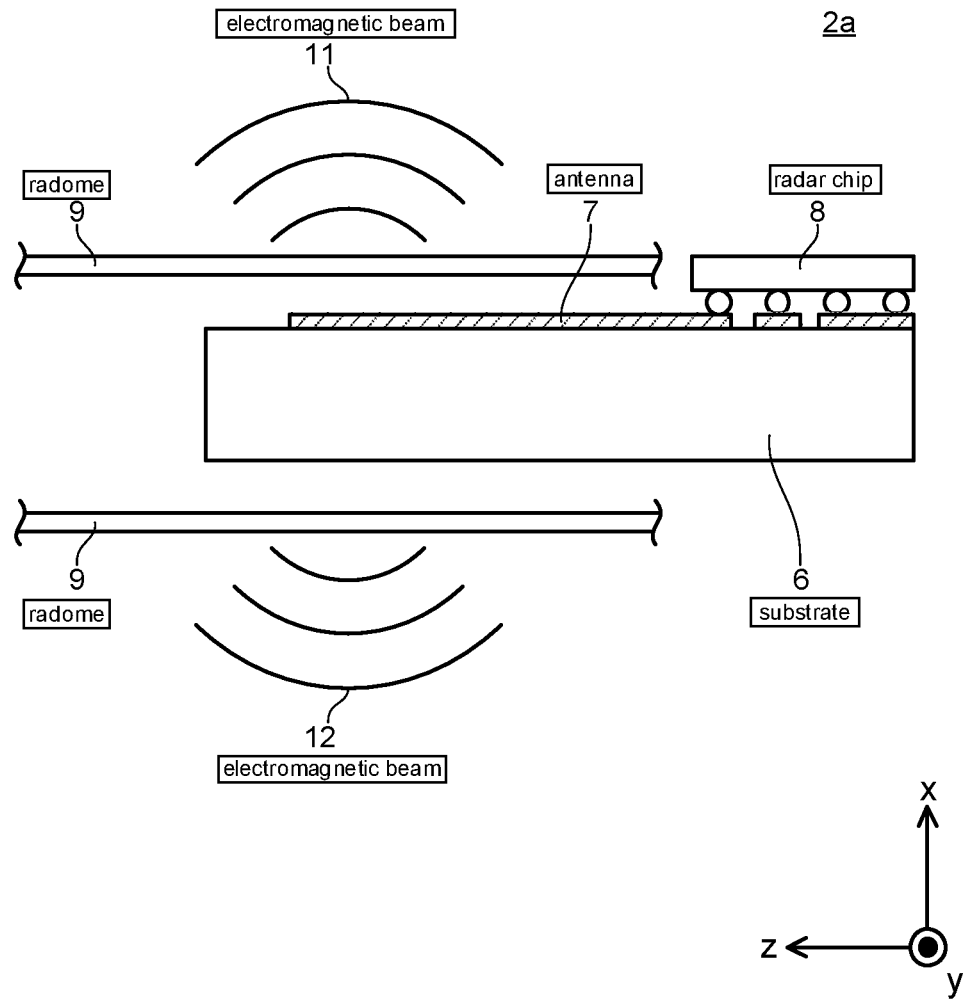
FIG. 3A is a schematic sectional view of a radar apparatus that is an example of the radar apparatus according to Embodiment 1.

FIG. 3A is a schematic sectional view of radar apparatus 2a, which is an example of radar apparatus 2 according to Embodiment 1.

Radar apparatus 2a includes substrate 6, antenna 7, radar chip (circuit) 8, and radome 9. In FIG. 3A, a portion of radome 9 is illustrated, and the rest is not illustrated.

Substrate 6 is provided with a circuit that implements the function of radar apparatus 2a. On a surface of substrate 6, antenna 7 is formed and radar chip 8 is mounted. The surface of substrate 6 on which radar chip 8 is mounted is hereinafter referred to as a top surface (first surface). In an example, at least one of electromagnetic beams 11 and 12 radiated from antenna 7 and its reflected signal are beams transmitted through substrate 6. Substrate 6 is preferably made of a low-loss substrate material for high frequencies, for example.

Antenna 7 outputs a transmission signal to radiate electromagnetic beams 11 and 12 through radome 9. Antenna 7 may be a single antenna or may be constituted by a plurality of antennas. Antenna 7 may have a MIMO configuration including one or more transmission antenna elements and one or more reception antenna elements.

Radar chip 8 generates a transmission signal to be transmitted from antenna 7, and generates a detection signal based on the reflected signal received by antenna 7. In an example, the signal processing circuit (not illustrated) connected to radar chip 8 determines whether occupants 41 and 42 are present, on the basis of the generated detection signal. For example, radar chip 8 has a configuration including a transmitter, a receiver, and an analog-to-digital converter (ADC).

Radome 9 protects substrate 6, antenna 7, and radar chip 8, which are provided in radar apparatus 2a. The thickness of radome 9 and the interval between substrate 6 and radome 9 are desirably adjusted so that the intensities of electromagnetic beams 11 and 12 to be radiated become maximum.

A circuit (for example, a circuit pattern and a mounted component) provided on substrate 6 are not arranged near antenna 7 or in a region immediately above and below antenna 7 so as not to block electromagnetic beams 11 and 12. Consequently, as illustrated in FIG. 3A, electromagnetic beams 11 and 12 are radiated to the outside from both surfaces of substrate 6, that is, from a front surface (the positive direction of the x axis) and a rear surface (the negative direction of the x axis), through radome 9.

Figure 3B:
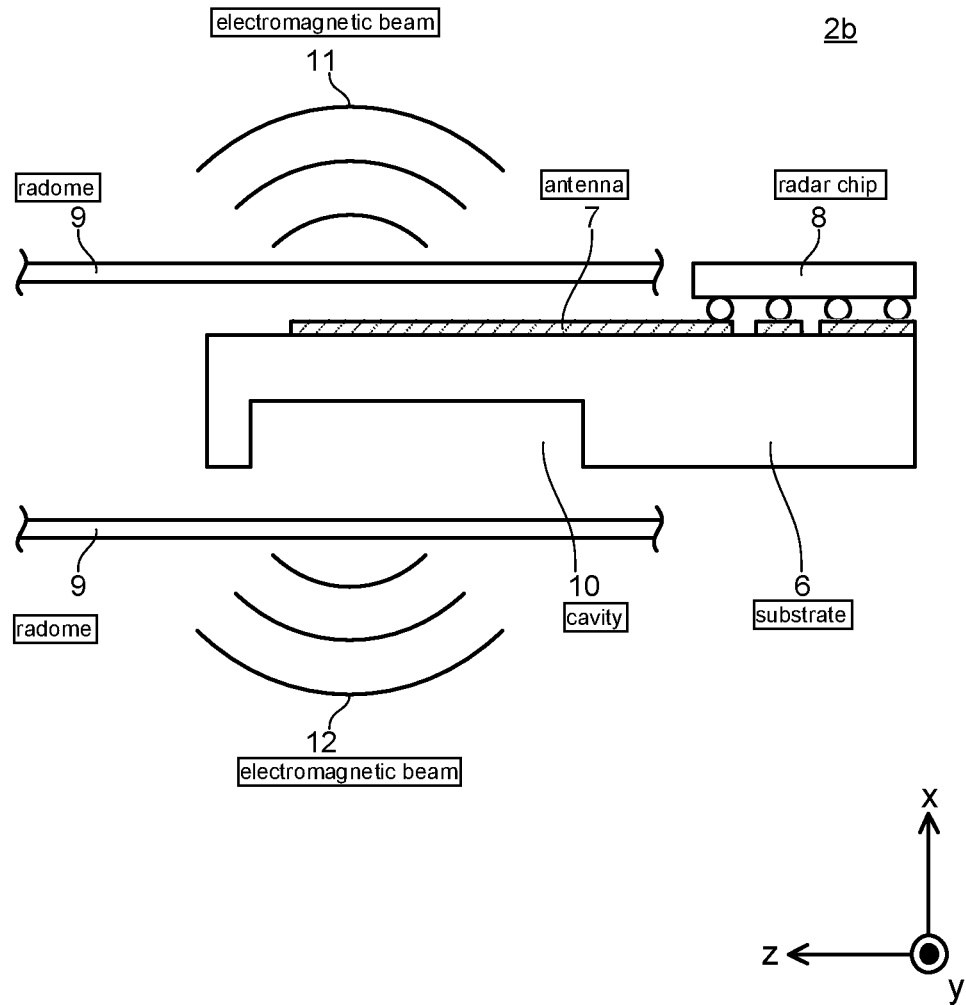
FIG. 3B is a schematic sectional view of a radar apparatus that is an example of the radar apparatus according to Embodiment 1.

FIG. 3B is a schematic sectional view of radar apparatus 2b, which is an example of radar apparatus 2 according to Embodiment 1.

Radar apparatus 2b illustrated in FIG. 3B is different from radar apparatus 2a illustrated in FIG. 3A in that the thickness of a region of substrate 6 through which electromagnetic beam 12 is transmitted is reduced to provide cavity 10 in substrate 6. For example, substrate 6 of radar apparatus 2b is provided with cavity 10 in the manner illustrated in FIG. 3B. Cavity 10 is provided on the side of substrate 6 opposite to the side on which antenna 7 is provided. With the configuration illustrated in FIG. 3B, the thickness of a portion of substrate 6 through which electromagnetic beam 12 radiated from antenna 7 toward the rear surface of substrate 6 is transmitted is smaller than the thickness of the corresponding portion of substrate 6 of radar apparatus 2a, and the loss of electromagnetic beam 12 due to transmission through the inside of substrate 6 can be reduced.

Cavity 10 may extend to an edge of substrate 6. The thickness of radome 9 and the interval between substrate 6 and radome 9 are preferably adjusted so that the intensities of electromagnetic beams 11 and 12 to be radiated become maximum with consideration of the shape of cavity 10. For example, radome 9 may have formed therein a recess (not illustrated) depending on the position or shape of cavity 10.

Figure 3C:
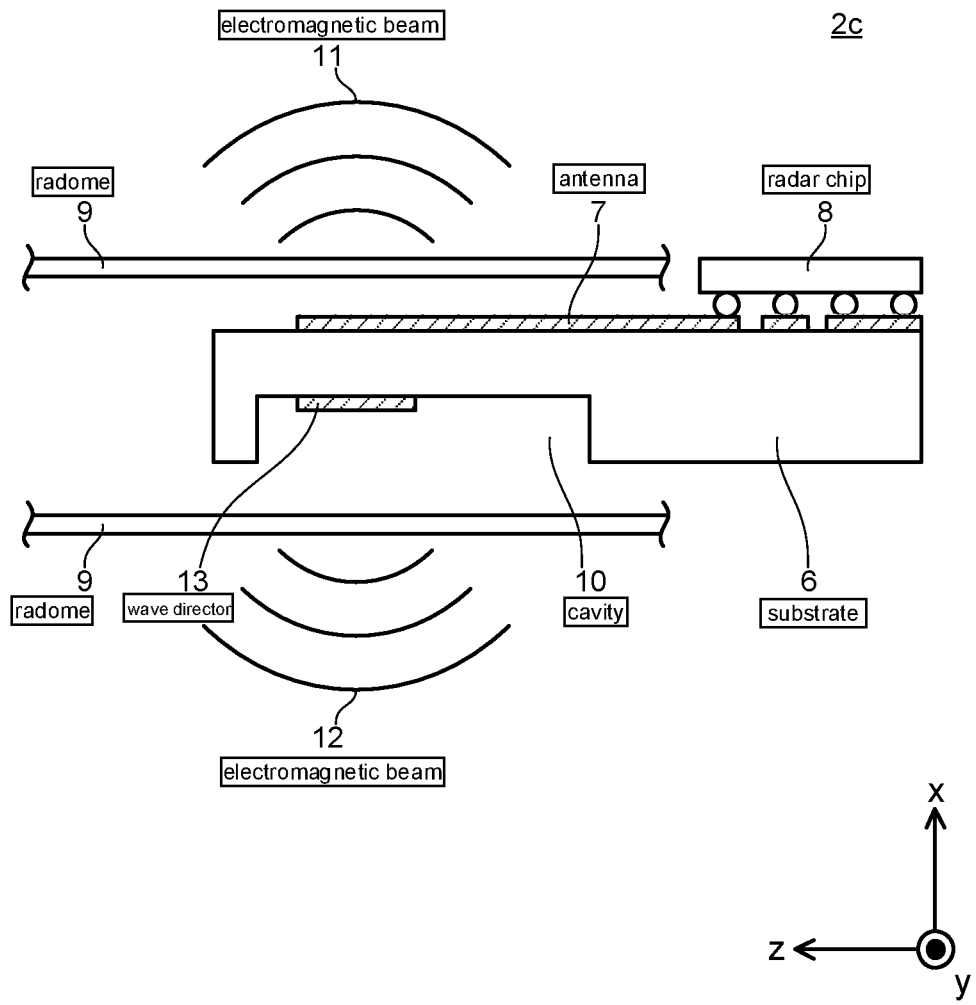
FIG. 3C is a schematic sectional view of a radar apparatus that is an example of the radar apparatus according to Embodiment 1.

FIG. 3C is a schematic sectional view of radar apparatus 2c, which is an example of radar apparatus 2 according to Embodiment 1.

Radar apparatus 2c illustrated in FIG. 3C is different from radar apparatus 2b illustrated in FIG. 3B in that wave director 13 is provided in cavity 10. The configuration illustrated in FIG. 3C can further improve the directivity of electromagnetic beam 12 to be radiated toward the rear surface of substrate 6 (the negative direction of the x axis).

Radar apparatus 2c illustrated in FIG. 3C is configured such that wave director 13 is provided inside cavity 10 of radar apparatus 2b illustrated in FIG. 3B. Likewise, for example, instead of cavity 10 being provided in radar apparatus 2a illustrated in FIG. 3A, the entire thickness of substrate 6 may be adjusted and, further, wave director 13 may be provided on the rear surface of substrate 6. This can further improve the directivity of electromagnetic beam 12 to be radiated toward the rear surface of substrate 6.

Also in radar apparatus 2c having wave director 13 arranged therein, the thickness of radome 9 and the interval between substrate 6 and radome 9 are preferably adjusted so that the intensities of electromagnetic beams 11 and 12 to be radiated become maximum with consideration of the shapes and positions of wave director 13 and radome 9.

Figure 3D:
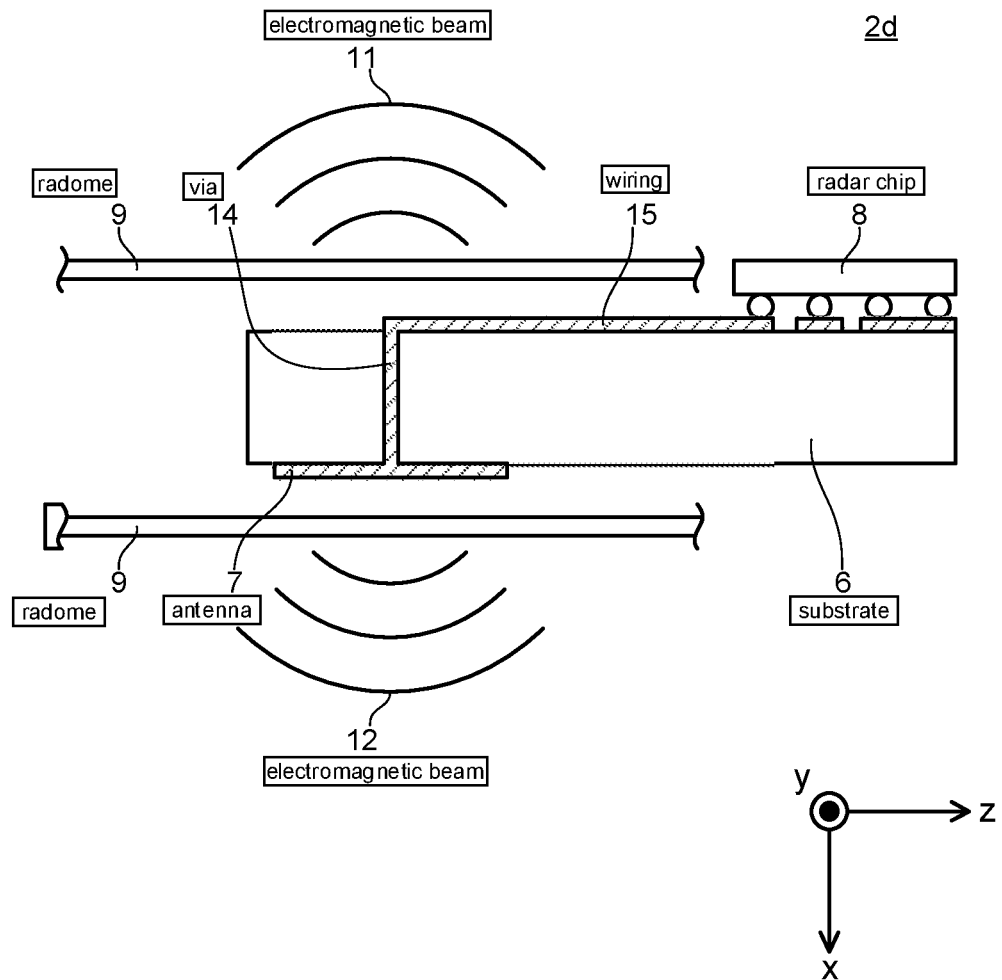
FIG. 3D is a schematic sectional view of a radar apparatus that is an example of the radar apparatus according to Embodiment 1.

FIG. 3D is a schematic sectional view of radar apparatus 2d, which is an example of radar apparatus 2 according to Embodiment 1.

Radar apparatus 2d illustrated in FIG. 3D is different from radar apparatus 2a illustrated in FIG. 3A in that antenna 7 is provided on the surface (second surface) of substrate 6 opposite to the surface on which radar chip 8 is provided. In an example, when radiation from via 14 or wiring 15, which is used to connect radar chip 8 and antenna 7 to each other, is generated, the generated radiation may be handled as radiation included in at least one of electromagnetic beams 11 and 12.

Figure 3E:
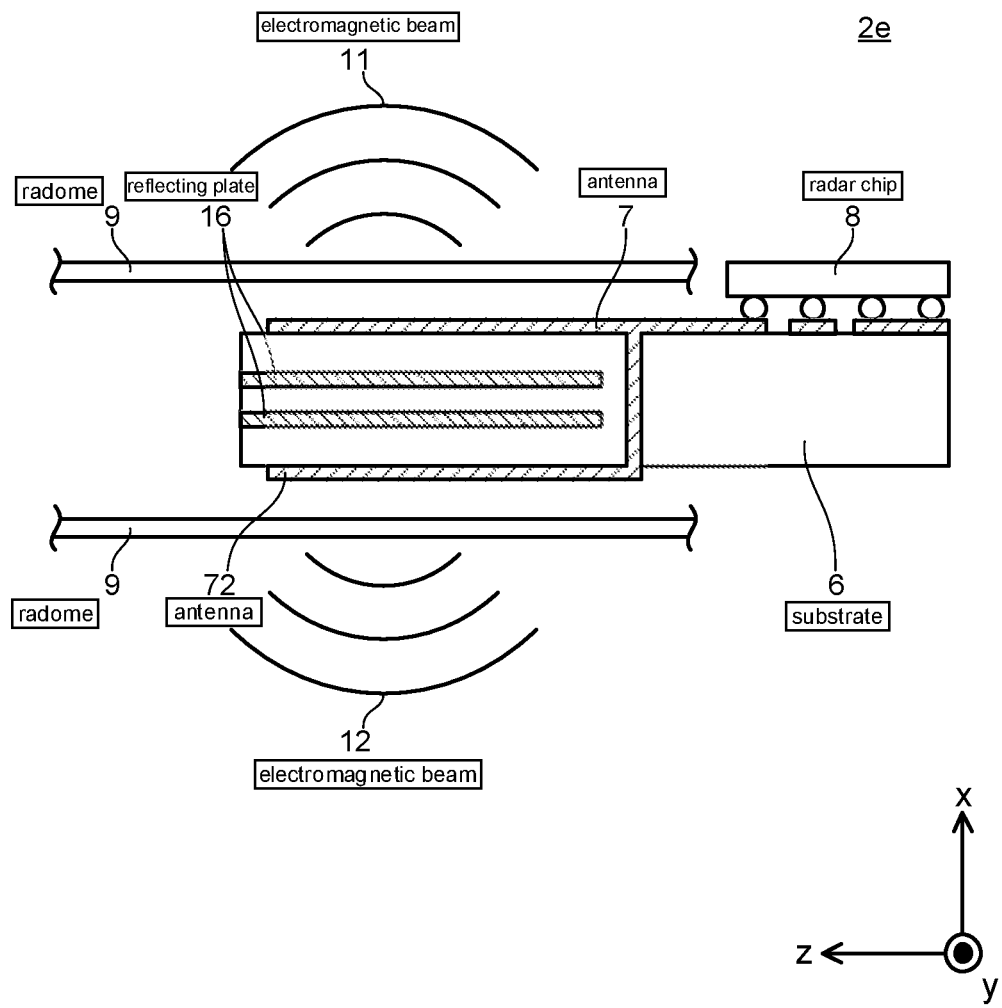
FIG. 3E is a schematic sectional view of a radar apparatus that is an example of the radar apparatus according to Embodiment 1.

FIG. 3E is a schematic sectional view of radar apparatus 2e, which is an example of radar apparatus 2 according to Embodiment 1.

Radar apparatus 2e illustrated in FIG. 3E is different from radar apparatus 2a illustrated in FIG. 3A in that antenna 72 is provided on the surface of substrate 6 opposite to the surface on which radar chip 8 is provided and in that reflecting plates 16 are provided in substrate 6. Reflecting plates 16 are metal plates, for example. While two reflecting plates 16 are illustrated in FIG. 3E, the number of reflecting plates 16 may be any number greater than or equal to one (for example, one, three, or four). With the provision of reflecting plates 16, the influence of an electromagnetic beam radiated from one of antennas 7 and 72 on the other antenna among antennas 7 and 72 can be reduced.

Figure 3F:
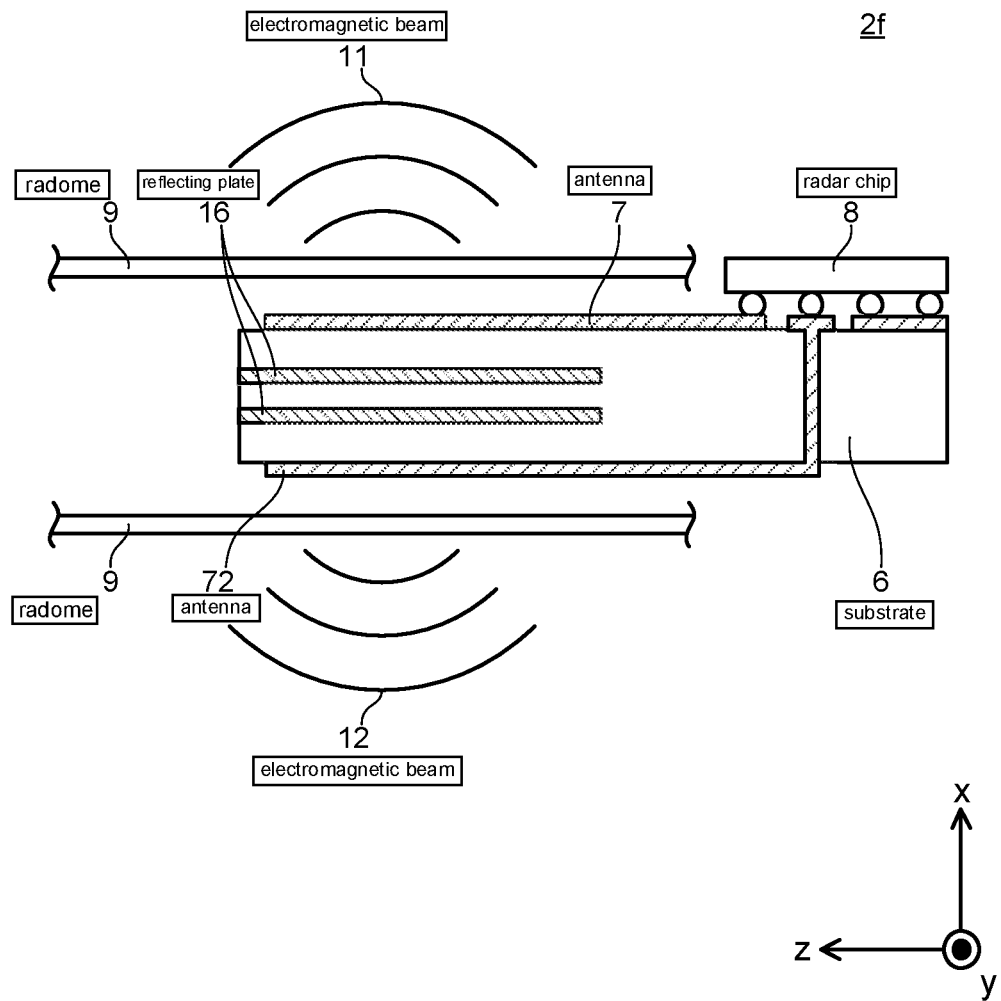
FIG. 3F is a schematic sectional view of a radar apparatus that is an example of the radar apparatus according to Embodiment 1.

FIG. 3F is a schematic sectional view of radar apparatus 2f, which is an example of radar apparatus 2 according to Embodiment 1.

Radar apparatus 2f illustrated in FIG. 3F is different from radar apparatus 2e illustrated in FIG. 3E in that antennas 7 and 72 are connected to different ports of radar chip 8.

In radar apparatus 2f, antenna 7 or 72 is connected to one transmission port of radar chip 8. Consequently, antenna output can further be enhanced, and the detectable distance can be made longer. Therefore, radar apparatus 2f may be used to detect danger outside the passenger compartment in addition to detecting occupants in the passenger compartment. In radar apparatus 2f, furthermore, the outputs of different antennas 7 and 72 connected to different transmission ports can be easily adjusted separately. In FIG. 3F, each of the transmission ports of radar chip 8 may output a signal of a different pattern.

Figure 4A:
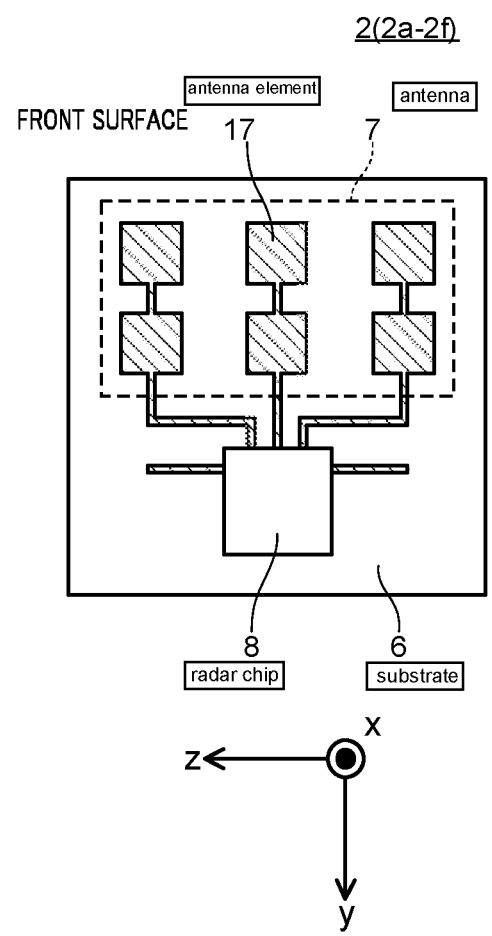
FIG. 4A is a diagram illustrating an example of arrangement of antenna elements constituting an antenna according to Embodiment 1.
Figure 4B:
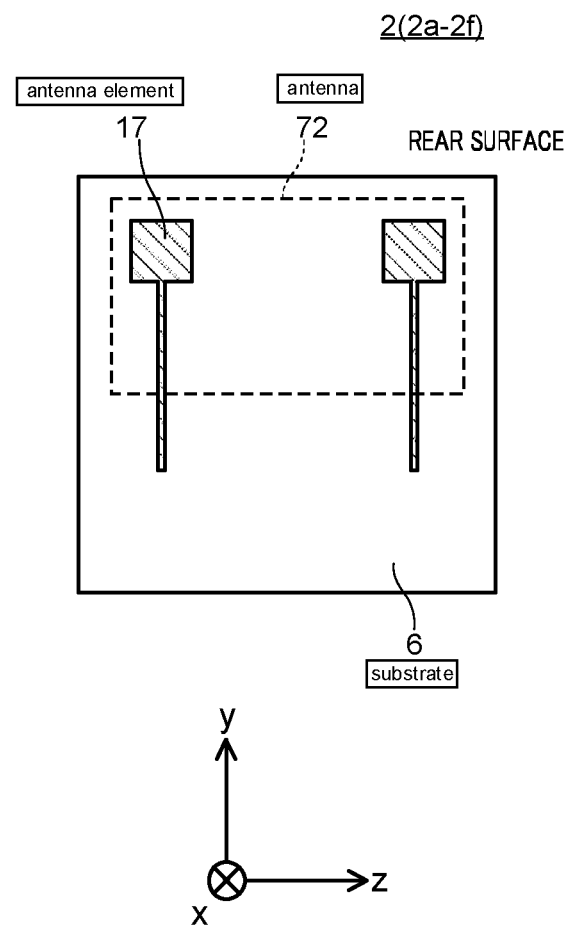
FIG. 4B is a diagram illustrating an example of arrangement of the antenna elements constituting the antenna according to Embodiment 1.

FIGS. 4A and 4B are diagrams illustrating an example of arrangement of antenna elements 17 constituting antennas 7 and 72 according to Embodiment 1.

For example, as illustrated in FIGS. 4A and 4B, the number of antenna elements 17 provided on the front surfaces of antennas 7 and 72 may be different from the number of antenna elements 17 provided on the rear surfaces of antennas 7 and 72 in accordance with the application of radar apparatus 2 (2a to 2f). This can adjust the antenna gain or viewing angle of antennas 7 and 72 in accordance with the application of radar apparatus 2 (2a to 2f).

(Modification 1)

In radar apparatus 2 (2a to 2f) according to Embodiment 1, electromagnetic beams 11 and 12 are radiated in a direction perpendicular to the top surface of substrate 6. In Modification 1, in contrast, electromagnetic beams 11 and 12 are radiated in a direction along the top surface of substrate 6.

Figure 5A:
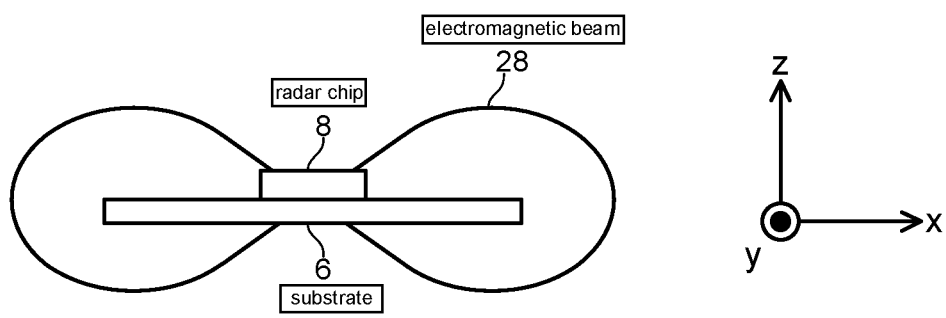
FIG. 5A is a diagram illustrating an example electromagnetic beam radiation pattern of a radar apparatus according to Modification 1.
Figure 5B:
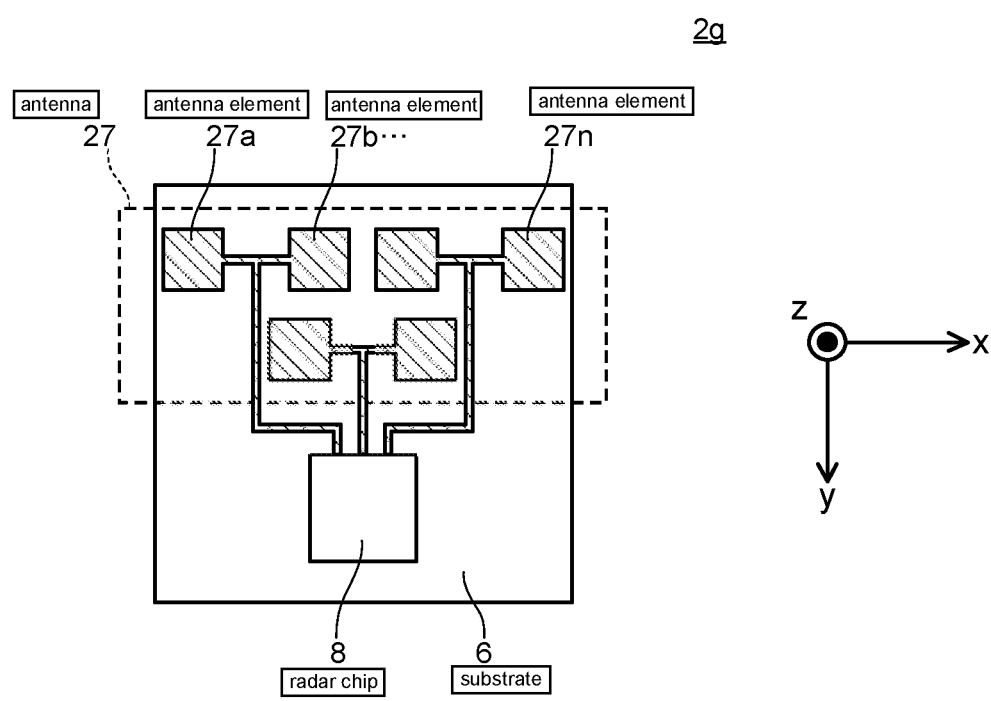
FIG. 5B is a diagram illustrating an example of arrangement of antenna elements constituting an antenna according to Modification 1.

FIG. 5A is a diagram illustrating an example radiation pattern of electromagnetic beam 28 of radar apparatus 2g according to Modification 1. FIG. 5B is a diagram illustrating an example of arrangement of antenna elements 27a to 27n constituting antenna 27 according to Modification 1.

Radar apparatus 2g includes substrate 6, radar chip 8, and antenna 27. Substrate 6 has arranged thereon antenna 27 that radiates electromagnetic beams from either surface (for example, the top surface) of substrate 6 in both right and left directions (the positive and negative directions of the x axis) along the front surface.

In antenna 27, signals that are 180 degrees out of phase are input to two antenna elements (for example, antenna elements 27a and 27b). Accordingly, as illustrated in the side view in FIG. 5A, electromagnetic beam 28 having directivity in separate, right and left directions of substrate 6 (directions along the top surface of substrate 6: the positive and negative directions of the x axis), rather than in the zenith direction (a direction perpendicular to the top surface of substrate 6: the positive direction of the z axis), is radiated. Radar apparatus 2g illustrated in FIGS. 5A and 5B can also be used to configure a sensor capable of simultaneously detecting a plurality of detection targets (occupants 41 and 42, targets) to the right and left sides of radar apparatus 2g.

The arrangement positions, number, and shapes of antenna 27 and antenna elements 27a to 27n are not limited to those illustrated in FIGS. 5A and 5B. For example, the number of antenna elements 27a to 27n may be any positive even number.

According to Embodiment 1 or Modification 1, a plurality of occupants can be simultaneously detected using one radar apparatus 2 (2a to 2g), and therefore cost can be reduced compared with the installation of a plurality of sensors or radar apparatuses.

Seats 51 and 52 illustrated in FIG. 2A, radar apparatuses 2a to 2g illustrated in FIGS. 3A to 3F and FIGS. 5A and 5B, and antennas 7 and 72 and antenna elements 17 illustrated in FIGS. 4A and 4B are merely examples, and the shapes and arrangements thereof are not limited to the illustrated ones.

The viewing angle of radar apparatus 2 (2a to 2g) may be extended in the horizontal direction. In addition, radar apparatus 2 may be installed such that the radiation direction of electromagnetic beam 11 (or electromagnetic beam 12) from radar apparatus 2 is directed toward the center of rear seat 52 so long as occupant 41 in front seat 51 can be detected without any difficulty. This allows radar apparatus 2 to detect an occupant seated in the center of rear seat 52.

Embodiment 2

When radar apparatus 2 is attached to seat 51 or 52, the orientations of electromagnetic beams 11, 12, and 28 from radar apparatus 2 changes with movement of seat 51 and/or 52, and it is difficult to detect occupants 41 and 42. In other words, the probability of error detection may become high. The movement of seat 51 and/or 52 refers to, for example, the forward or backward slide of seat 51 and/or 52 or a change in the inclination angle of the backrest portion of seat 51 and/or 52 when seat 51 and/or 52 is reclined. Embodiment 2 examines difficulty in detecting occupants 41 and 42 depending on movement of seat 51 and/or 52.

Figure 6:
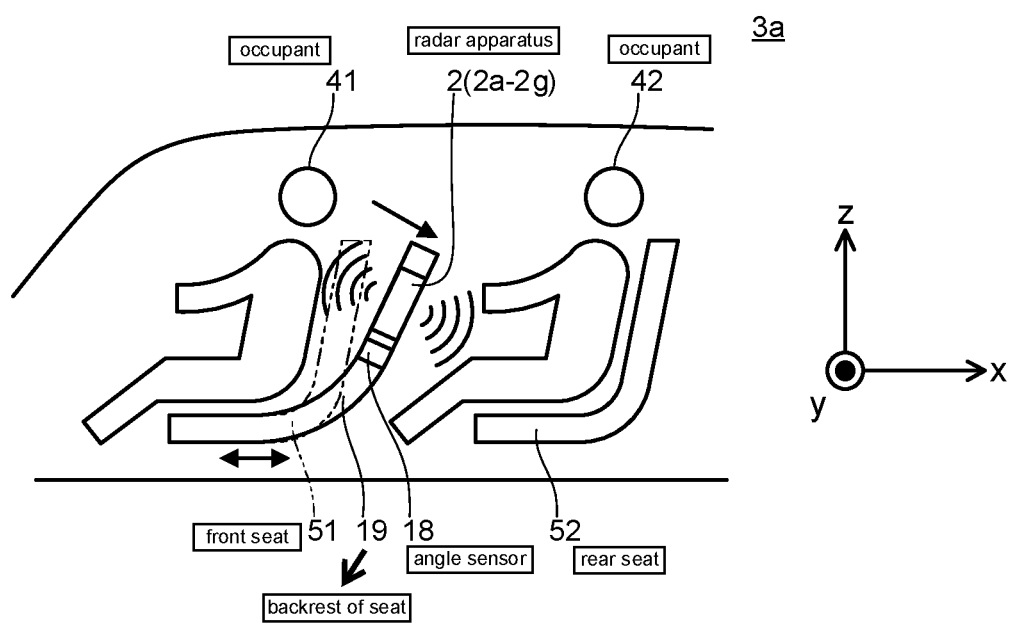
FIG. 6 is a diagram illustrating an example of attachment of a radar system according to Embodiment 2 to a vehicle.

FIG. 6 is a diagram illustrating an example of attachment of radar system 3a according to Embodiment 2 to a vehicle.

Radar system 3a includes radar apparatus 2 and angle sensor 18.

Radar apparatus 2 according to Embodiment 2 includes components common to radar apparatus 2 according to Embodiment 1. Radar apparatus 2 may be any one of radar apparatuses 2a to 2g illustrated in FIGS. 3A to 3F and FIGS. 5A and 5B.

Angle sensor 18 detects the orientation of radar apparatus 2. Angle sensor 18 is installed inside or near radar apparatus 2, for example.

Front seat 51 is typically a reclining seat. Front seat 51 in which radar apparatus 2 is installed has backrest 19 whose angle may be changed to the angle desired by occupant 41. In accordance with the degree of inclination of seat 51, the radiation direction of an electromagnetic beam directed to occupant 42 in rear seat 52 from radar apparatus 2 changes. Consequently, occupant 42 in rear seat 52 may be outside the detection range of radar apparatus 2 depending on the angle of backrest 19.

Angle sensor 18 stores in advance a range of angles over which it is difficult for radar apparatus 2 to detect occupant 42. While radar apparatus 2 is in operation, in response to detection that the angle of front seat 51 detected by angle sensor 18 is included in the range of angles stored in angle sensor 18, angle sensor 18 may output a signal indicating that it is difficult to perform detection (or the detection result is invalid). In an example, radar system 3a may include a notifier (not illustrated) that notifies occupant 41 that it is difficult to perform detection (or the detection result is invalid) when angle sensor 18 outputs a signal indicating that it is difficult to perform detection (or the detection result is invalid). The notifier may be, for example, a monitor viewed by occupant 41 or a speaker provided in the vehicle.

In an example, if front seat 51 is slidable as well as reclinable to make its forward or backward position adjustable, radar system 3a includes a position sensor (not illustrated) that detects the forward or backward position of front seat 51. In this case, the position sensor stores in advance a range of positions over which it is difficult for radar apparatus 2 to detect occupant 42. While radar apparatus 2 is in operation, in response to detection that the position of front seat 51 detected by the position sensor is included in the range of positions stored in the position sensor, the position sensor may output a signal indicating that it is difficult to perform detection (or the detection result is invalid). This may allow more accurate detection of a state where it is difficult for radar apparatus 2 to detect occupants 41 and 42.

In an example, furthermore, radar apparatus 2 stores in advance a reflected signal from an object arranged inside or outside the passenger compartment. The higher the reflection coefficient the object has, the more preferable it is. For example, the object may be a fixed object, such as the frame of the vehicle body, or a movable object whose movement is known, such as a rear wiper. Then, at the time of detection by radar apparatus 2, a signal processing circuit (not illustrated) connected to radar apparatus 2 determines whether it is difficult to perform detection (or the detection result is invalid), on the basis of a received reflected signal and the stored reflected signal. The signal processing circuit detects whether occupants 41 and 42 are present in seats 51 and 52, respectively, on the basis of a difference signal between a received reflected signal and the stored reflected signal. This may allow more accurate detection of a state where it is difficult for radar apparatus 2 to detect occupants 41 and 42. The signal processing circuit may be connected to radar chip 8 and arranged inside radar apparatus 2.

Embodiment 3

In Embodiment 2, angle sensor 18 is used to detect a state where it is difficult for radar apparatus 2 to detect occupants 41 and 42 depending on movement of seat 51 and/or 52. Embodiment 3 examines any other means for detecting a state where it is difficult for radar apparatus 2 to detect occupants 41 and 42 depending on movement of seat 51 and/or 52.

Figure 7A:
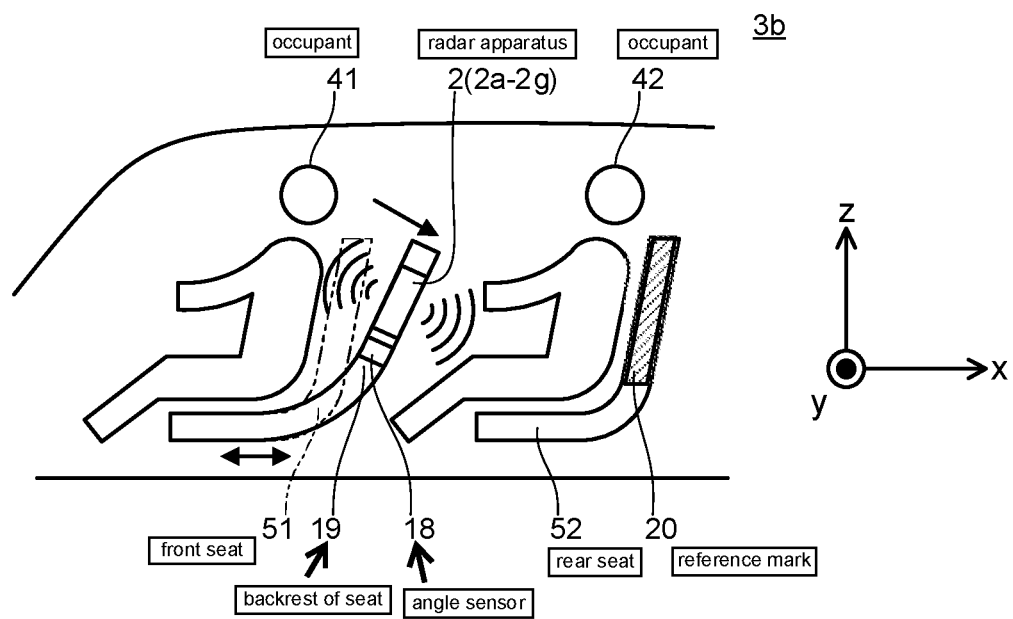
FIG. 7A is a diagram illustrating an example of attachment of a radar system according to Embodiment 3 to a vehicle.
Figure 7B:
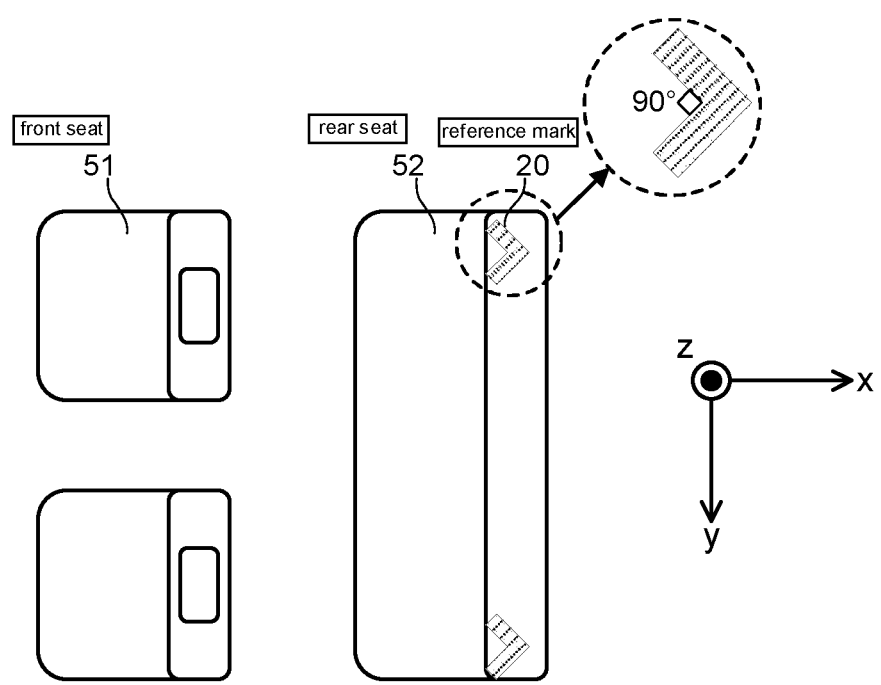
FIG. 7B is a diagram illustrating an example of attachment of the radar system according to Embodiment 3 to a vehicle.

FIGS. 7A and 7B are diagrams illustrating an example of attachment of radar system 3b according to Embodiment 3 to a vehicle. Radar system 3b includes radar apparatus 2 and reference marks (first reference mark, reference target) 20. In an example, radar system 3b further includes angle sensor 18. Among the components of radar system 3b according to Embodiment 3, components common to radar system 3a according to Embodiment 2 will not be described.

Radar apparatus 2 includes components common to radar apparatus 2 according to Embodiment 1. Radar apparatus 2 may be any one of radar apparatuses 2a to 2g illustrated in FIGS. 3A to 3F and FIGS. 5A and 5B. Further, in response to detection of a reflected signal corresponding to a reflected wave from reference marks 20, a signal processing circuit (not illustrated) connected to radar apparatus 2 determines that it is possible to detect seats 51 and 52 (it is not difficult to perform detection (or the detection result is not invalid)).

Reference marks 20 reflect electromagnetic beam 11 or electromagnetic beam 12 radiated from radar apparatus 2. In an example, as illustrated in FIG. 7B, reference marks 20 are installed on both sides of rear seat 52. It is more preferable that a reflected signal from each of reference marks 20 have higher intensity than a reflected signal from a human body. As illustrated in FIG. 7B, reference marks 20 may be each a rectangular metal plate that is bent on one side at an angle of 90° relative to the center axis in the longitudinal direction of the rectangular metal plate, for example. The metal plate is installed such that reflection surfaces that reflect electromagnetic beam 11 or electromagnetic beam 12 intersect at an acute angle.

In radar system 3b according to Embodiment 3, the signal processing circuit (not illustrated) connected to radar apparatus 2 can determine whether it is difficult for radar apparatus 2 to perform detection (or the detection result is invalid), on the basis of a reflected signal from reference marks 20. While reference marks 20 illustrated in FIGS. 7A and 7B are installed on both sides of rear seat 52, the shapes, installation positions, and number of reference marks 20 are not limited.

Figure 8A:
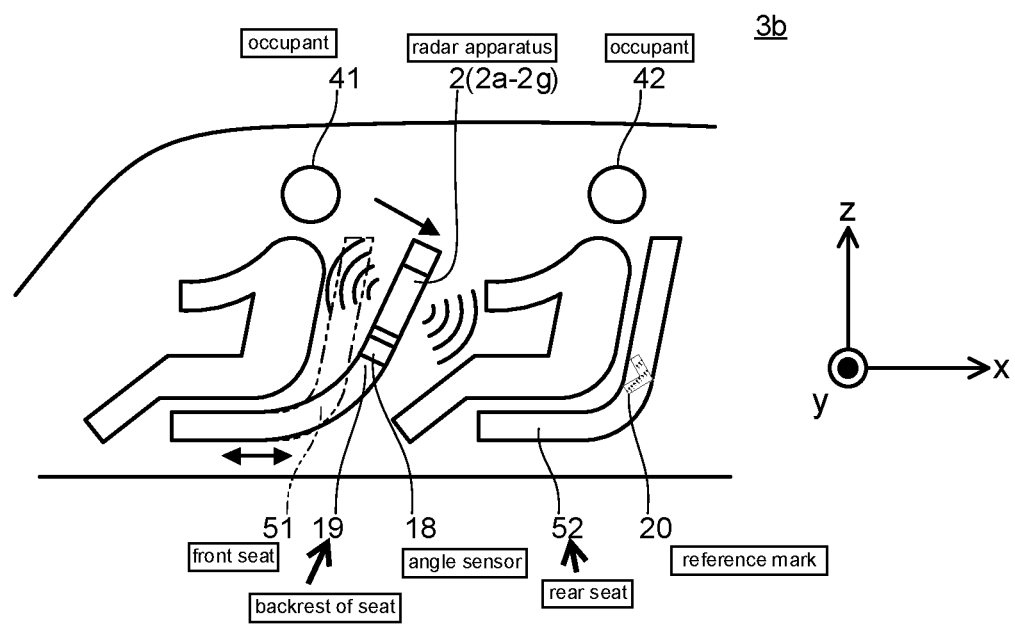
FIG. 8A is a diagram illustrating another example of attachment of the radar system according to Embodiment 3 to a vehicle.
Figure 8B:
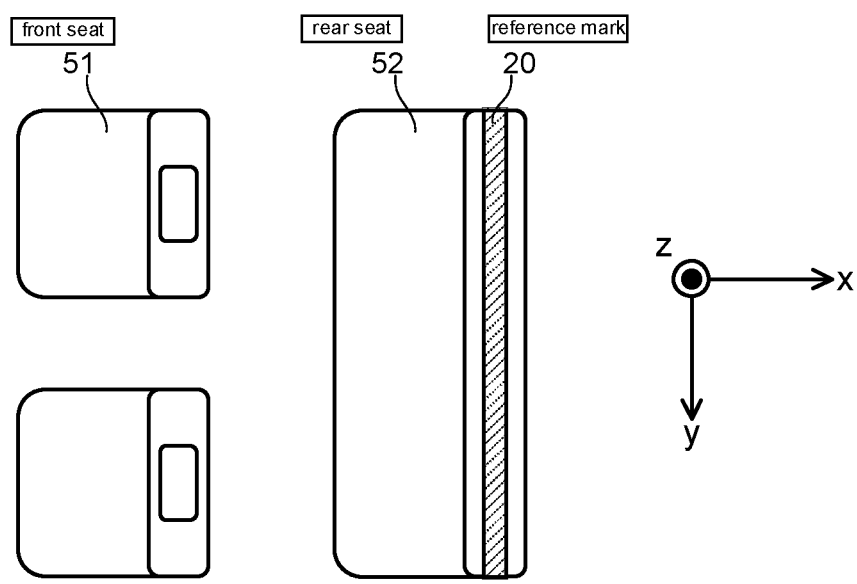
FIG. 8B is a diagram illustrating another example of attachment of the radar system according to Embodiment 3 to a vehicle.

FIGS. 8A and 8B are diagrams illustrating another example of attachment of radar system 3b according to Embodiment 3 to a vehicle. For example, as illustrated in FIGS. 8A and 8B, reference mark 20, which is a rectangular metal plate, may be arranged in such a manner that its longitudinal direction extends in the horizontal direction.

When reference mark 20 is arranged in the manner illustrated in FIGS. 8A and 8B, reference mark 20 is less likely to be hidden by occupant 42 and a load (not illustrated) in rear seat 52 from radar apparatus 2 than reference marks 20 illustrated in FIGS. 7A and 7B. This can reduce potential detection errors indicating that "it is difficult to perform detection (or the detection result is invalid)" due to difficulty in obtaining a reflected signal from reference mark 20 because reference mark 20 is hidden by occupant 42 and a load.

The number and positions of reference marks 20 whose longitudinal directions extend in the horizontal direction are not limited to those illustrated in FIGS. 8A and 8B.

Figure 9A:
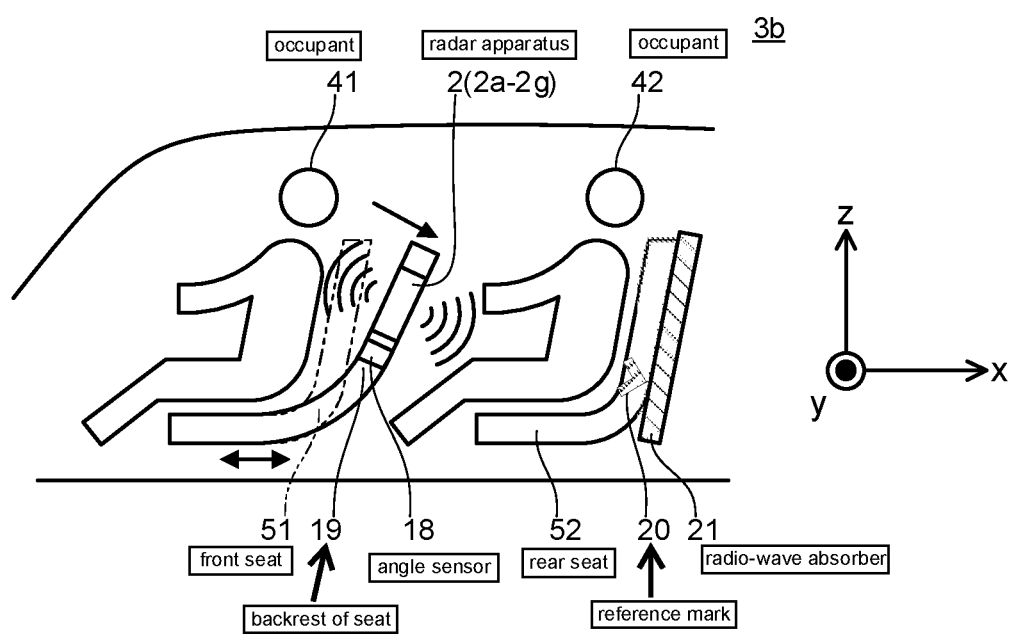
FIG. 9A is a diagram illustrating another example of attachment of the radar system according to Embodiment 3 to a vehicle.
Figure 9B:
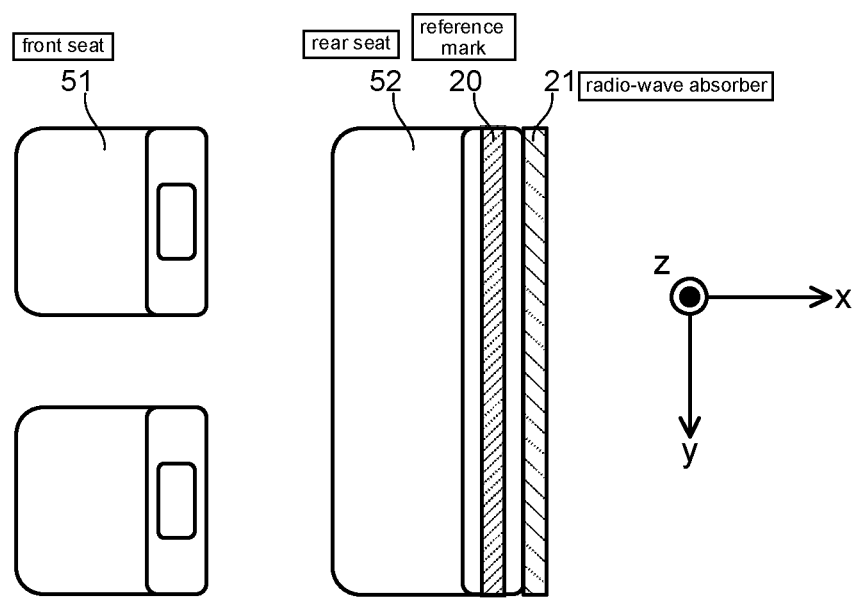
FIG. 9B is a diagram illustrating another example of attachment of the radar system according to Embodiment 3 to a vehicle.

FIGS. 9A and 9B are diagrams illustrating another example of attachment of radar system 3b according to Embodiment 3 to a vehicle. In an example, as illustrated in FIGS. 9A and 9B, radar system 3b further includes radio-wave absorber 21.

As illustrated in FIGS. 9A and 9B, radio-wave absorber 21 is arranged on the back of reference mark 20, for example. This allows radar apparatus 2 to more easily distinguish a reflected signal from reference mark 20 and a reflected signal from a structure installed near reference mark 20 from each other, and thus a reflected signal from reference mark 20 can be more reliably identified.

The shape and position of radio-wave absorber 21 are not limited to those illustrated in FIGS. 9A and 9B so long as radar apparatus 2 is able to easily distinguish a reflected signal from reference mark 20 and a reflected signal from a structure installed near reference mark 20 from each other. Reference mark 20 may be a combination of at least one of reference marks 20 illustrated in FIGS. 7A and 7B, FIGS. 8A and 8B, and FIGS. 9A and 9B.

Figure 10:
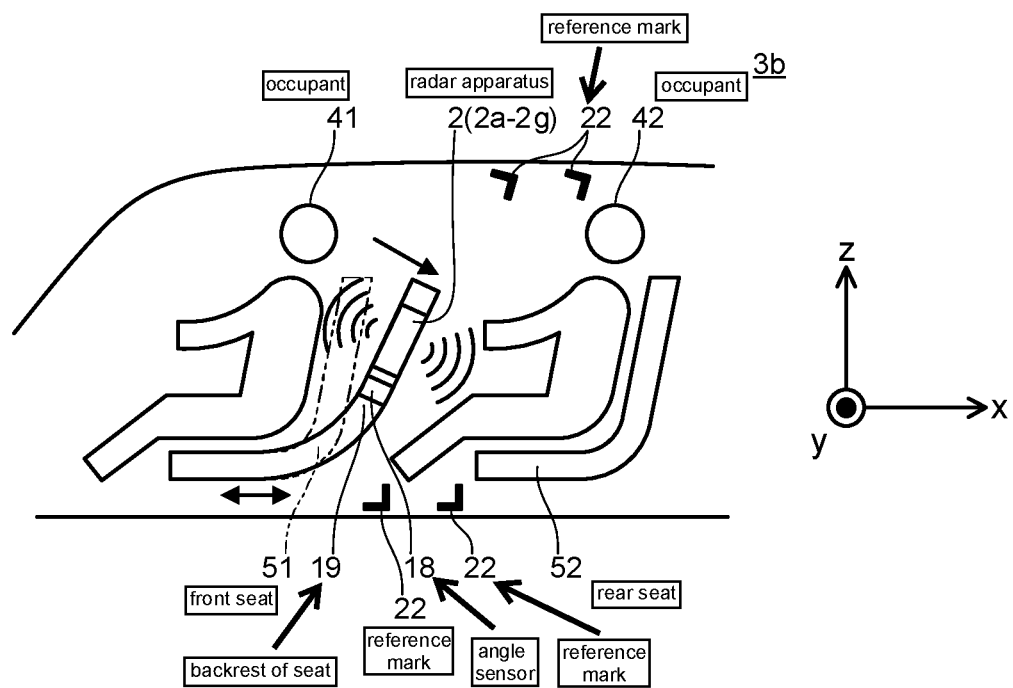
FIG. 10 is a diagram illustrating another example of attachment of the radar system according to Embodiment 3 to a vehicle.

FIG. 10 is a diagram illustrating another example of attachment of radar system 3b according to Embodiment 3 to a vehicle. In an example, as illustrated in FIG. 10, radar system 3b further includes reference mark (second reference mark, reference target) 22.

Reference mark 22 reflects electromagnetic beam 11 or electromagnetic beam 12 radiated from radar apparatus 2. In an example, as illustrated in FIG. 10, reference mark 22 is installed in a ceiling portion or a floor portion of the passenger compartment. It is more preferable that a reflected signal from each of reference marks 22 have higher intensity than a reflected signal from a human body. As illustrated in FIG. 10, reference marks 22 may be each a rectangular metal plate that is bent on one side at an angle of 90° relative to the center axis in the longitudinal direction of the rectangular metal plate, for example. The metal plate is installed such that reflection surfaces that reflect electromagnetic beam 11 or 12 intersect at an acute angle.

When radar apparatus 2 detects a reflected signal from reference marks 22, the signal processing circuit (not illustrated) connected to radar apparatus 2 determines that it is difficult to perform detection. This allows the signal processing circuit (not illustrated) connected to radar apparatus 2 to determine whether it is difficult for radar apparatus 2 to perform detection (or the detection result is invalid), on the basis of a reflected signal from reference marks 22.

The number, shapes, and positions of reference marks 22 are not limited to those illustrated in FIG. 10. Furthermore, reference marks 22 may be each implemented as a fixed object installed in the passenger compartment illustrated in FIG. 10 or a movable object whose movement is known.

The shape and position of radio-wave absorber 21 are not limited to those illustrated in FIGS. 9A and 9B so long as radar apparatus 2 is able to easily distinguish a reflected signal from reference marks 22 and a reflected signal from a structure installed near reference mark 20 from each other.

Embodiment 4

This embodiment describes radar system 3 including two radar apparatuses 2 to sense occupants in a vehicle having three rows of seats.

Figure 11:
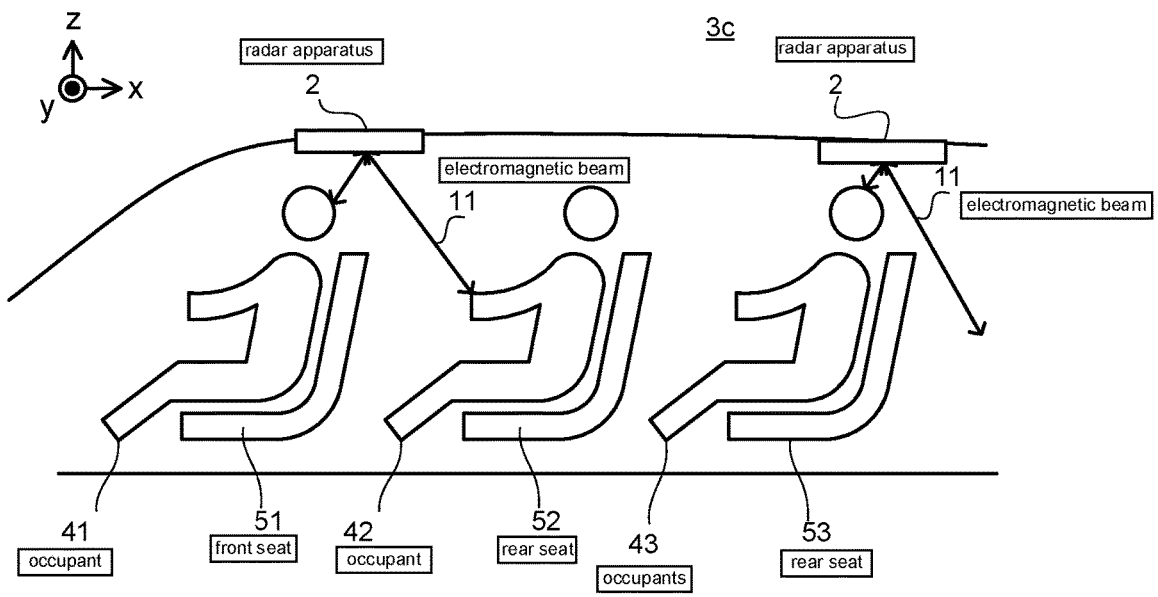
FIG. 11 is a diagram illustrating an example of attachment of a radar system according to Embodiment 4 to a vehicle.

FIG. 11 is a diagram illustrating an example of attachment of radar system 3c according to Embodiment 4 to a vehicle. In radar system 3c illustrated in FIG. 11, two radar apparatuses 2 are arranged in a vehicle having three rows of seats. Radar apparatuses 2 have a function of applying at least an electromagnetic beam (radar signal, transmission signal) toward an occupant in the passenger compartment and are arranged in the ceiling of the passenger compartment. Radar apparatuses 2 apply electromagnetic beams to occupants 41, 42, and 43, thereby performing occupant sensing.

Two radar apparatuses 2 are arranged above the first-row seat and above the third-row seat. Accordingly, radar apparatus 2 above the first-row seat has a detection range covering the first-row seat and the second-row seat, and radar apparatus 2 above the third-row seat has a detection range covering the third-row seat and a cargo space behind the third-row seat.

Figure 12:
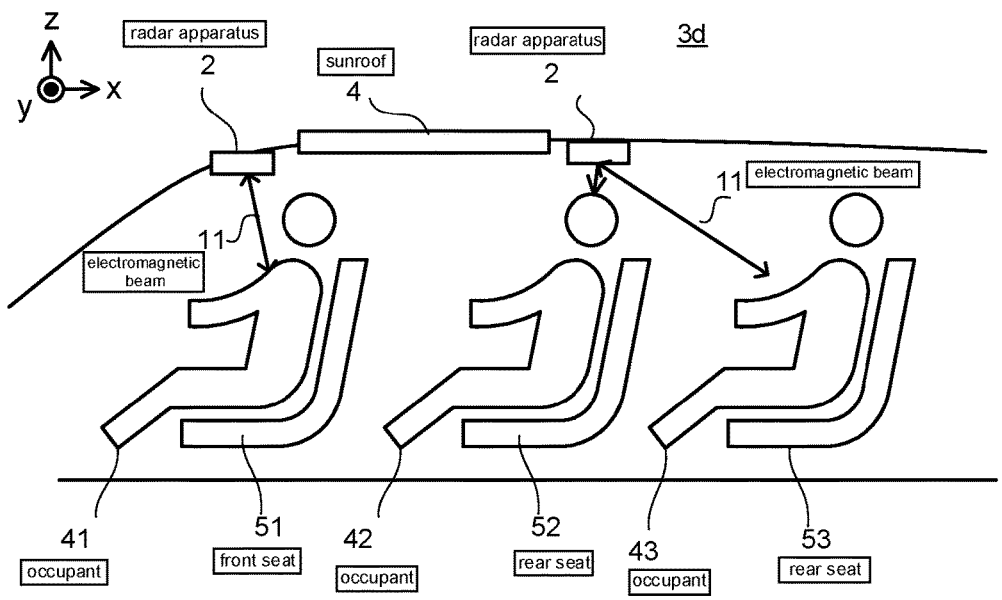
FIG. 12 is a diagram illustrating another example of attachment of the radar system according to Embodiment 4 to a vehicle.

FIG. 12 is a diagram illustrating another example of attachment of radar system 3d according to Embodiment 4 to a vehicle. In radar system 3d illustrated in FIG. 12, two radar apparatuses 2 are arranged in a vehicle having three rows of seats. FIG. 12 illustrates an example of arrangement of radar apparatuses in which sunroof 4 arranged above the first-row seat is taken into consideration. Two radar apparatuses 2 are arranged near a head console, which is located in front of and above the first-row seat, and above the second-row seat. Accordingly, radar apparatus 2 near the head console located in front of and above the first-row seat has a detection range covering the first-row seat, and radar apparatus 2 above the second-row seat has a detection range covering the second-row seat and the third-row seat.

Figure 13:
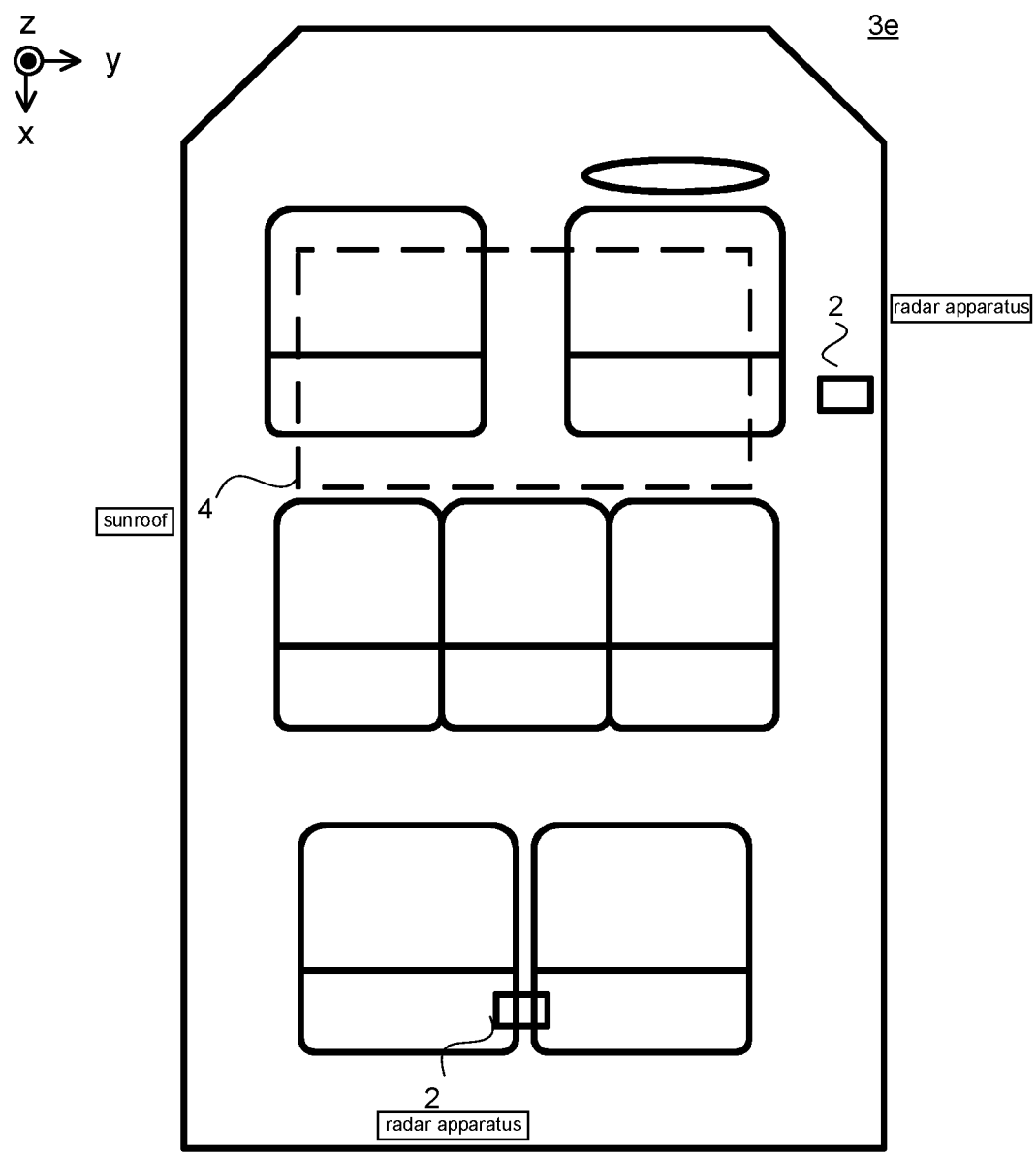
FIG. 13 is a top view illustrating another example of attachment of the radar system according to Embodiment 4 to a vehicle.

FIG. 13 is a top view illustrating another example of attachment of radar system 3e according to Embodiment 4 to a vehicle. In radar system 3e illustrated in FIG. 13, two radar apparatuses 2 are arranged in a vehicle having three rows of seats.

FIG. 13 illustrates an example of arrangement of radar apparatuses 2 when sunroof 4 arranged above the first-row seat is taken into consideration. Sunroof 4 is indicated by a dotted line. Radar apparatuses 2 are arranged at a position, which is offset relative to the first-row seat in the positive direction of the y axis such that the position is shifted away from sunroof 4, and at a position above the third-row seat. Accordingly, radar apparatus 2 at a position shifted away from sunroof 4 has a detection range covering the first-row seat and the second-row seat, and radar apparatus 2 above the third-row seat has a detection range covering the third-row seat and the cargo space behind the third-row seat.

The example arrangements illustrated in FIGS. 12 and 13 may be used even when sunroof 4 is not installed. Since sunroof 4 is an optional part, changing the arrangement of radar apparatuses 2 depending on whether sunroof 4 is installed results in an increase in production cost. In contrast, radar apparatuses 2 are fixedly arranged, regardless of whether sunroof 4 is installed, leading to a reduction in production cost. The examples of the arrangement of radar apparatuses 2 illustrated in FIGS. 12 and 13 may also be applied to a vehicle having two rows of seats.

Embodiment 5

This embodiment describes a radar system including one radar apparatus 2 to sense occupants in a vehicle having three rows of seats.

Figure 14:
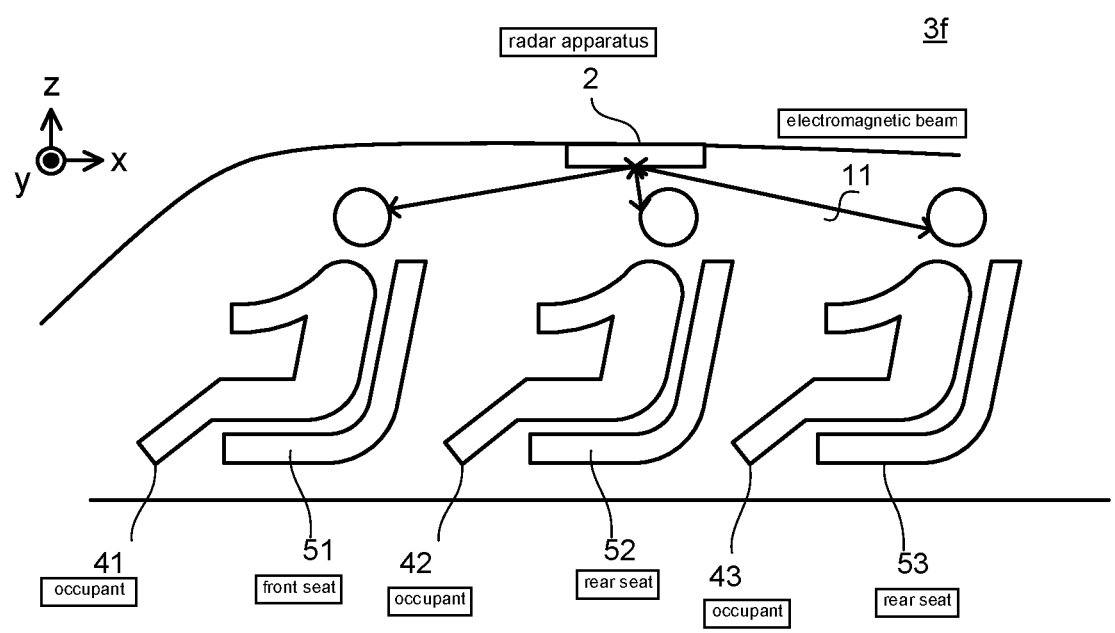
FIG. 14 is a diagram illustrating an example of attachment of a radar system according to Embodiment 5 to a vehicle.

FIG. 14 is a diagram illustrating another example of attachment of radar system 3f according to Embodiment 5 to a vehicle. In radar system 3f illustrated in FIG. 14, one radar apparatus 2 is arranged in a vehicle having three rows of seats.

An antenna of radar apparatus 2 has a wide viewing angle to apply radiation to occupants 41, 42, and 43. Accordingly, radar apparatus 2 is further equipped with an antenna for occupants 41 and 42, whose directivity is adjusted, in addition to an antenna for occupant 42.

Figure 15:
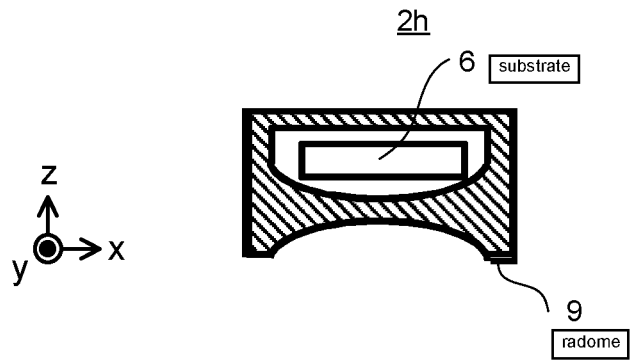
FIG. 15 is a schematic sectional view of a radar apparatus that is an example of a radar apparatus according to Embodiment 5.

FIG. 15 is a schematic sectional view of a radar apparatus that is an example of a radar apparatus according to Embodiment 5. In FIG. 15, radar apparatus 2h has a configuration in which a radome is arranged to surround substrate 6. Radar apparatus 2h illustrated in FIG. 15 may use a portion of radome 9 as a concave lens to broaden the viewing angle of beams. In this embodiment, as in FIGS. 3A to 3F, substrate 6 has antenna 7 and radar chip 8 mounted thereon, which will not be described or illustrated here.

Figure 16:
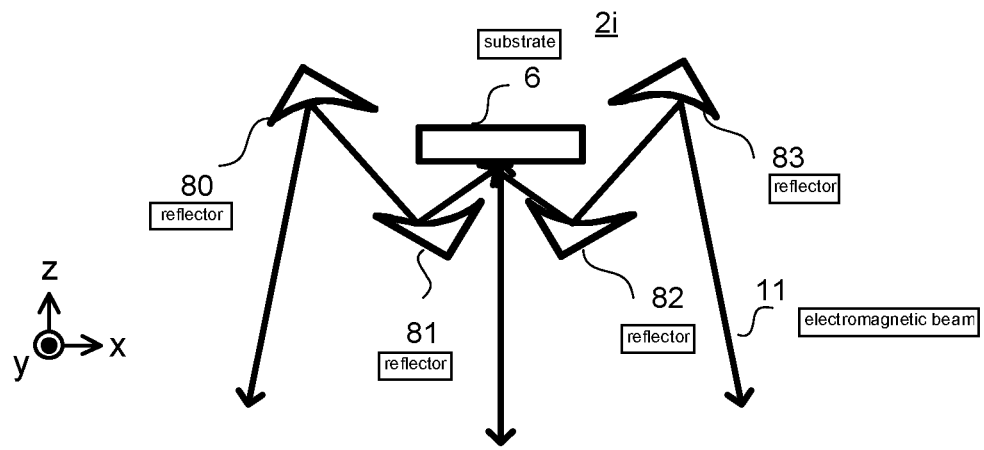
FIG. 16 is a schematic sectional view of a radar apparatus that is another example of the radar apparatus according to Embodiment 5.

FIG. 16 is a schematic sectional view of radar apparatus 2i, which is another example of the radar apparatus according to Embodiment 5. In FIG. 16, reflectors 80, 81, 82, and 83 (also be referred to as reflecting plates) may be provided to direct electromagnetic beams to occupants 41 and 43 from antenna elements 17 (not illustrated) arranged on substrate 6. In FIG. 16, antenna elements 17 arranged on substrate 6 transmit and receive direct waves to and from occupant 42.

Figure 17:
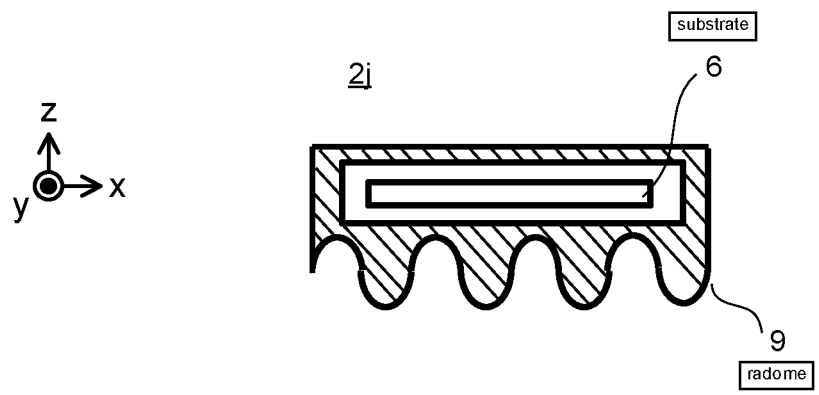
FIG. 17 is a schematic sectional view of a radar apparatus that is another example of the radar apparatus according to Embodiment 5.

FIG. 17 is a schematic sectional view of radar apparatus 2j, which is another example of the radar apparatus according to Embodiment 5. In FIG. 17, radome 9 is arranged to surround substrate 6, and preferably has a configuration in which a surface (surface facing in the negative direction of the z axis) of radome 9 is shaped with concavity and convexity such that a radio wave can be scattered in various directions. The shape with concavity and convexity may be a periodic uniform shape, as illustrated in FIG. 17, or may be an irregular, random shape. Radome 9 may not cover all of substrate 6 and may be arranged to have a shape with concavity and convexity at least on a side thereof from which an electromagnetic beam is radiated.

Figure 18:
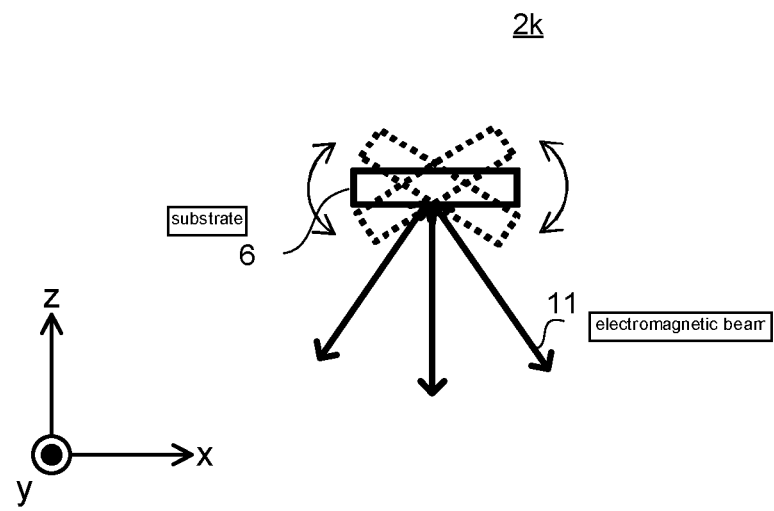
FIG. 18 is a schematic sectional view of a radar apparatus that is another example of the radar apparatus according to Embodiment 5.
Figure 19:
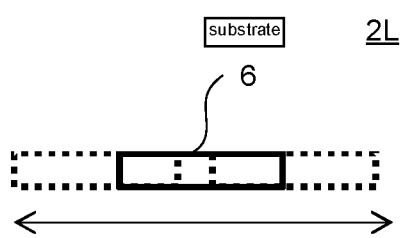
FIG. 19 is a schematic sectional view of a radar apparatus that is another example of the radar apparatus according to Embodiment 5.

FIG. 18 is a diagram illustrating another example of radar apparatus 2 according to Embodiment 5. FIG. 19 is a diagram illustrating another example of radar apparatus 2 according to Embodiment 5.

In radar apparatus 2k illustrated in FIG. 18, a drive section (not illustrated) is used to physically change the orientation of radar apparatus 2k in a periodic manner so that occupants 41 to 43 are within the viewing angle. Each occupant is sensed in accordance with this period, thereby sensing occupants 41, 42, and 43 even if the viewing angle of radar apparatus 2 is small. As illustrated in FIG. 19, radar apparatus 2L may be driven by a drive section (not illustrated) to translate in the forward and backward directions. Advantages effects similar to those in FIG. 18 are achieved.

Figure 20:
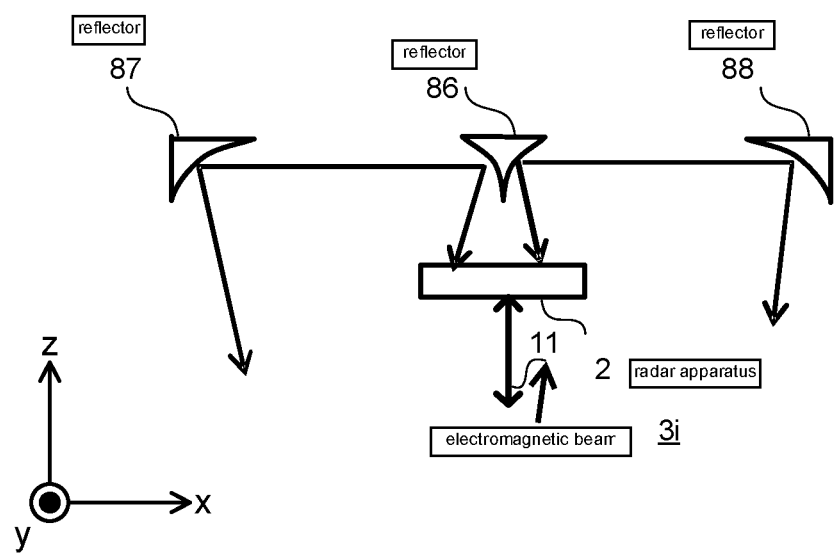
FIG. 20 is a schematic sectional view of a radar apparatus that is another example of the radar apparatus according to Embodiment 5.

FIG. 20 is a diagram illustrating another example of radar apparatus 2 according to Embodiment 5. In FIG. 20, radar apparatus 2 is attached above the second-row seat such that electromagnetic beams are applied both toward occupant 42 (the negative direction of the z axis) and toward the ceiling (the positive direction of the z axis) from radar apparatus 2. Reflector 86 is installed at a position closer to the ceiling than radar apparatus 2 to split a beam into the forward and backward directions of the passenger compartment.

Reflector 86 has at least two reflection surfaces facing in the forward direction (the negative direction of the x axis) and the backward direction (the positive direction of the x axis), and the reflection surfaces are desirably made of metal and concave. The concave surfaces of reflector 86 can be each implemented using, for example, a portion of a paraboloid.

Reflectors 87 and 88 are installed in front of and behind reflector 86. Each of reflectors 87 and 88 desirably has a metal reflection surface, and the reflection surfaces of reflectors 87 and 88 are desirably processed into a flat or concave shape such that electromagnetic beams are reflected toward occupants 41 and 43. Furthermore, reflectors 87 and 88 are desirably arranged such that path lengths of electromagnetic beams from radar apparatus 2 to occupants 41 and 43 are different.

With the configuration described above, each of occupants 41, 42, and 43 in the three rows of seats is associated with a path length of an electromagnetic beam, thereby facilitating sensing using one radar apparatus 2.

Modification of Embodiment 5

This embodiment describes a radar system that uses one radar apparatus 2 and a reflector to sense occupants in a vehicle having three rows of seats.

Figure 21:
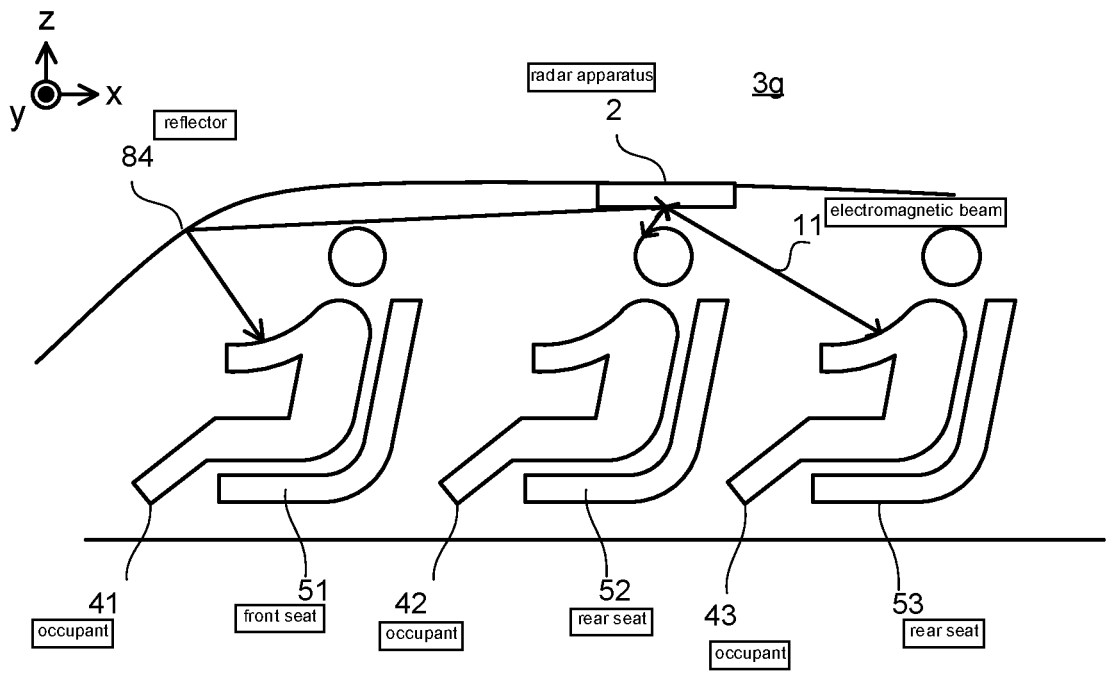
FIG. 21 is a diagram illustrating an example of attachment of a radar system according to a modification of Embodiment 5 to a vehicle.

FIG. 21 is a diagram illustrating an example of attachment of radar system 3g according to a modification of Embodiment 5 to a vehicle. In FIG. 21, radar system 3g uses the windshield as reflector 84.

In FIG. 21, an occupant in the first-row seat is sensed by utilizing a multipath radio wave, which is a reflected wave component from the windshield (the reflector 84). A radio wave beam radiated from radar apparatus 2 is reflected from the windshield (the reflector 84) and is then reflected from the occupant in the first-row seat. The radio wave beam reflected from the occupant is reflected again from the windshield (the reflector 84), and a multipath radio wave is received by radar apparatus 2. Accordingly, radar system 3g illustrated in FIG. 21 detects occupant 41 in the first-row seat as an object at a position farther than the actual distance between the first-row seat and radar apparatus 2.

Radar apparatus 2 determines whether occupant 41 is present, using, as determination criteria, whether a reflective object (occupant 41) is present at a position that takes into consideration in advance the increase in distance caused by reflection and whether a reflection point on the windshield matches an angle that takes into consideration the position of radar apparatus 2.

The reflected wave from the windshield is input to radar apparatus 2 from an end (closer to the end-fire), compared with a direct reflected wave from occupant 41 in the first-row seat.

Radar system 3g may use, for example, a rear-view mirror, side-view mirrors, or the like in place of the windshield serving as reflector 84 illustrated in FIG. 21. A rear-view mirror and side-view mirrors are adjusted at an angle visible to the driver to allow the driver to have a clear view of the rear of the vehicle. Accordingly, radar apparatus 2 is arranged above the second-row seat behind the driver, thereby allowing radar apparatus 2 to receive an electromagnetic beam reflected by the rear-view mirror.

In radar system 3g, a weak reflected wave is considered to be input to an occupant seated in the front passenger's seat from the rear-view mirror. For the occupant seated in the front passenger's seat, accordingly, the installation position of radar apparatus 2 may be offset toward either the front passenger's seat or the driver's seat with respect to the center to adjust the intensity of a reflected wave from the corresponding side-view mirror. For the occupant seated in the front passenger's seat, alternatively, a reflector other than a mirror may be provided in the vehicle.

Figure 22:
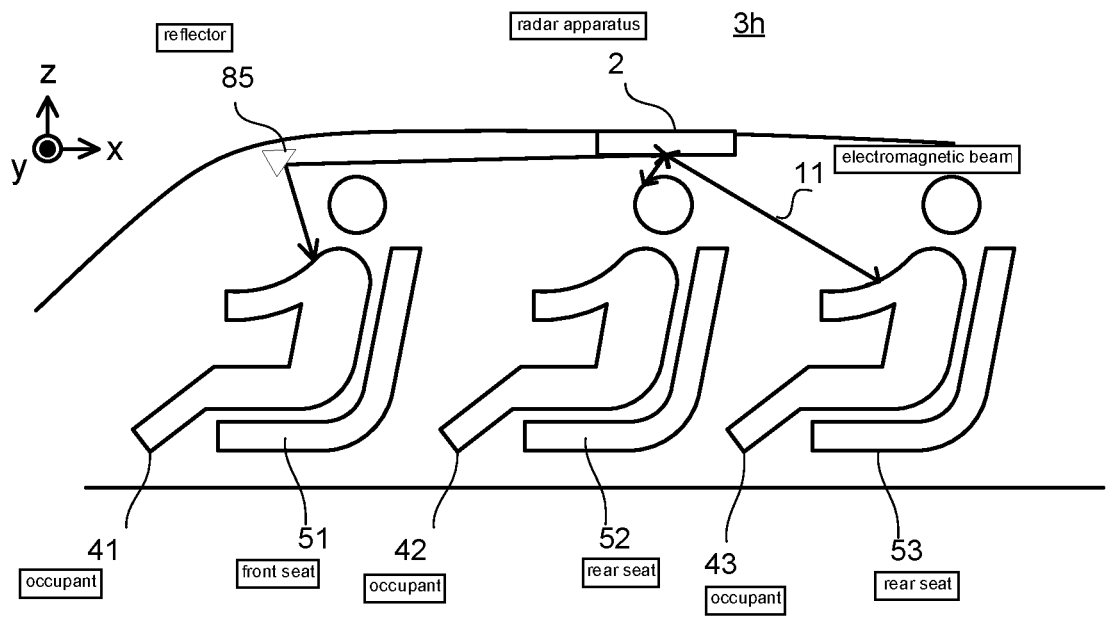
FIG. 22 is a diagram illustrating another example attachment of a radar system according to a modification of Embodiment 5 to a vehicle.

FIG. 22 is a diagram illustrating another example of attachment of a radar system according to a modification of Embodiment 5 to a vehicle. In FIG. 22, radar system 3h has a rear-view mirror (reflector 85) arranged near the head console. The head console is located above the first-row seat, thereby facilitating detection of an occupant in the first-row seat compared to when a reflected wave from the windshield is used.

Reflector 85, which is arranged near the head console, may be a single reflector to split and reflect an electromagnetic beam (radar signal) into the right and left seats, or reflectors 85 may be arranged for the right and left seats. This can increase the intensity of reflected signals from the respective seats, resulting in more accurate reception of the reflected signals. When reflectors 85 are arranged for the right and left seats, reflectors 85 are arranged to be offset from radar apparatus 2 to provide a difference in path length, thereby facilitating the determination of reflected waves (reflected signals) from the right and left seats.

Other examples of the reflector (reflecting plate) may include reflector 85 that is arranged in an attachment portion of the rear-view mirror.

Figure 23:
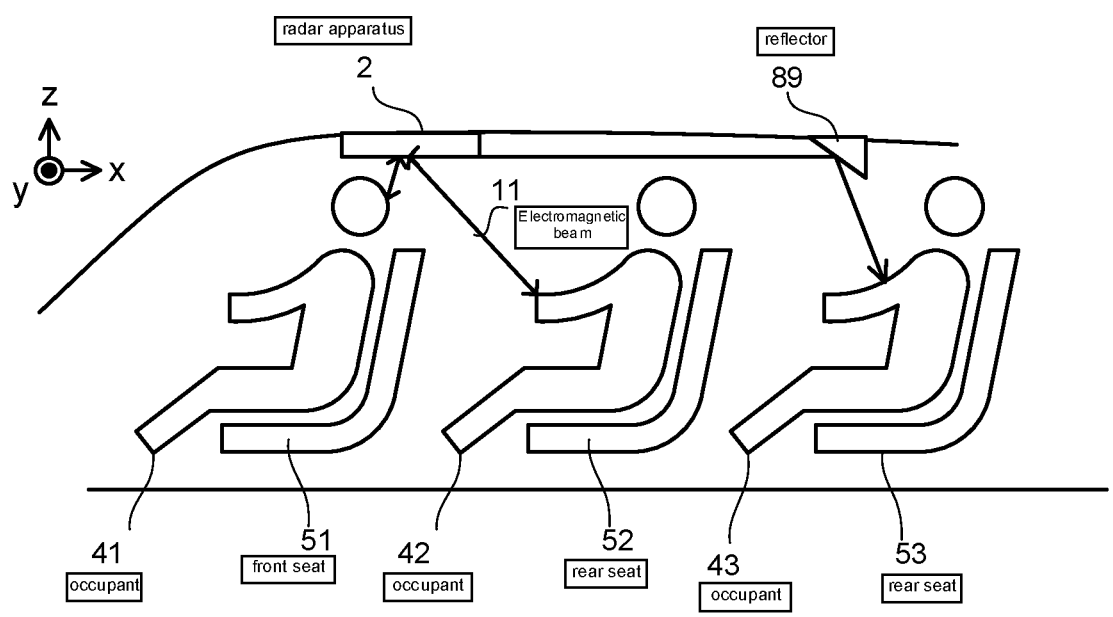
FIG. 23 is a diagram illustrating another example of attachment of a radar system according to a modification of Embodiment 5 to a vehicle.

FIG. 23 is a diagram illustrating another example of attachment of radar system 3j according to a modification of Embodiment 5 to a vehicle. In FIG. 23, radar apparatus 2 is arranged above the first-row seat, thereby having a detection range covering the first-row seat and the second-row seat. Further, reflector 89 is arranged above the third-row seat, thereby allowing radar apparatus 2 to have a detection range covering the third-row seat.

Figure 24:
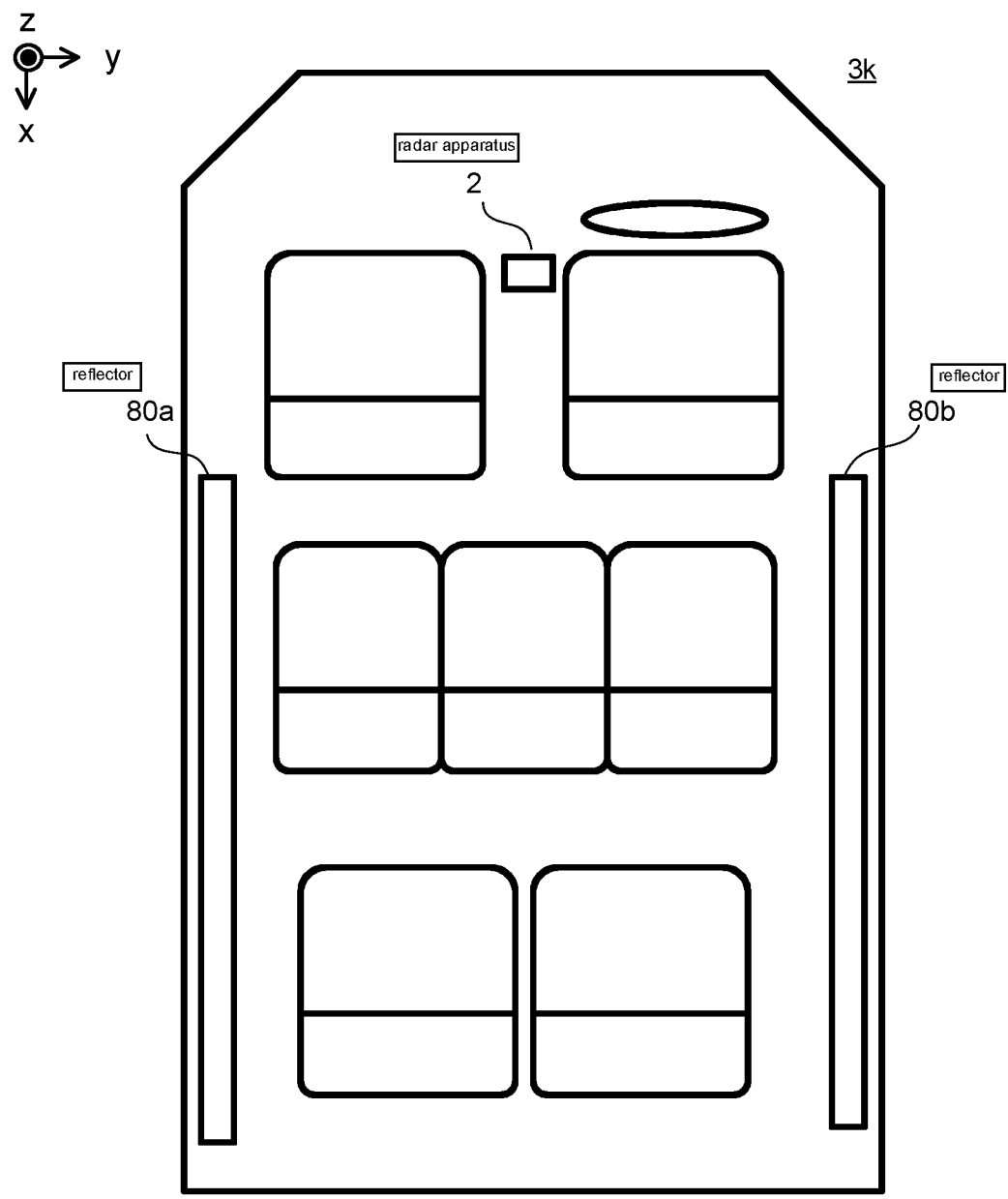
FIG. 24 is a top view illustrating another example of attachment of a radar system according to a modification of Embodiment 5 to a vehicle.

FIG. 24 is a top view illustrating another example of attachment of radar system 3k according to a modification of Embodiment 5 to a vehicle. In FIG. 24, radar apparatus 2 is arranged near the head console located in front of and above the first-row seat, thereby having a detection range covering the first-row seat. Further, reflectors 80a and 80b are arranged in the left and right edges of the ceiling of the vehicle, thereby allowing radar apparatus 2 to have a detection range covering the second-row seat and the third-row seat. In FIG. 24, long and narrow reflectors 80a and 80b are used. Alternatively, a plurality of reflectors having a smaller area may be arranged.

Reflectors 80a and 80b may be shaped such that, for the second-row seat and the third-row seat, electromagnetic beams from radar apparatus 2 to reflectors 80a and 80b are transmitted in parallel to the ceiling and the directions of the electromagnetic beams are changed from reflectors 80a and 80b to the desired seats.

Furthermore, with the use of long and narrow reflectors 80a and 80b, even when the second-row seat and the third-row seat slide, a radar signal from radar apparatus 2 can be reflected by the occupants in the second-row seat and the third-row seat.

Figure 25:
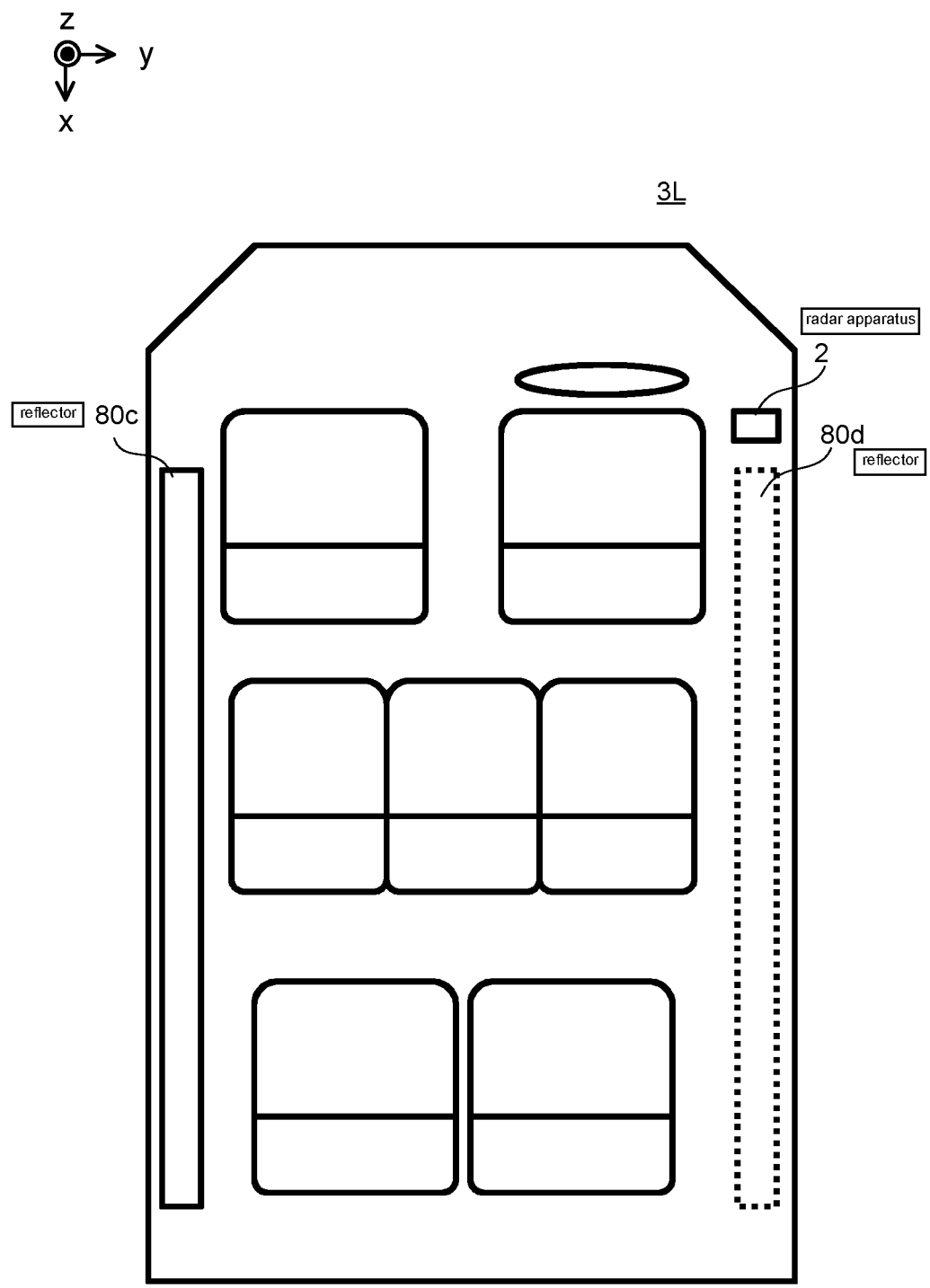
FIG. 25 is a top view illustrating another example of attachment of a radar system according to a modification of Embodiment 5 to a vehicle.

FIG. 25 is a top view illustrating another example of attachment of radar system 3L according to a modification of Embodiment 5 to a vehicle. In FIG. 25, radar apparatus 2 is arranged to be offset relative to the first-row seat in the positive direction of the y axis, thereby having a detection range covering the first-row seat. Further, reflector 80c is arranged in the left edge of the ceiling of the vehicle (the negative direction of the y axis), thereby allowing radar apparatus 2 to have a detection range covering the second-row seat and the third-row seat. In FIG. 25, reflector 80c may be arranged above the first-row seat such that an occupant in the first-row left seat is detected using a reflected signal.

Reflector 80d may further be arranged in the right edge of the ceiling (the positive direction of the y axis). Radar apparatus 2 may detect an occupant by a reflected wave that is reflected from reflector 80c in the left edge of the ceiling and that is further reflected from reflector 80d. In this case, reflector 80c may have a configuration including a portion in which the reflected wave is reflected toward the reflector 80d, and a portion in which the reflected wave is reflected toward the desired seat.

In the configuration illustrated in FIGS. 23, 24, and 25, the use of a reflector allows a radar apparatus to detect occupants in the second-row seat and the third-row seat. Even a child whose sitting height is smaller than the height of the backrest can be detected.

Figure 26:
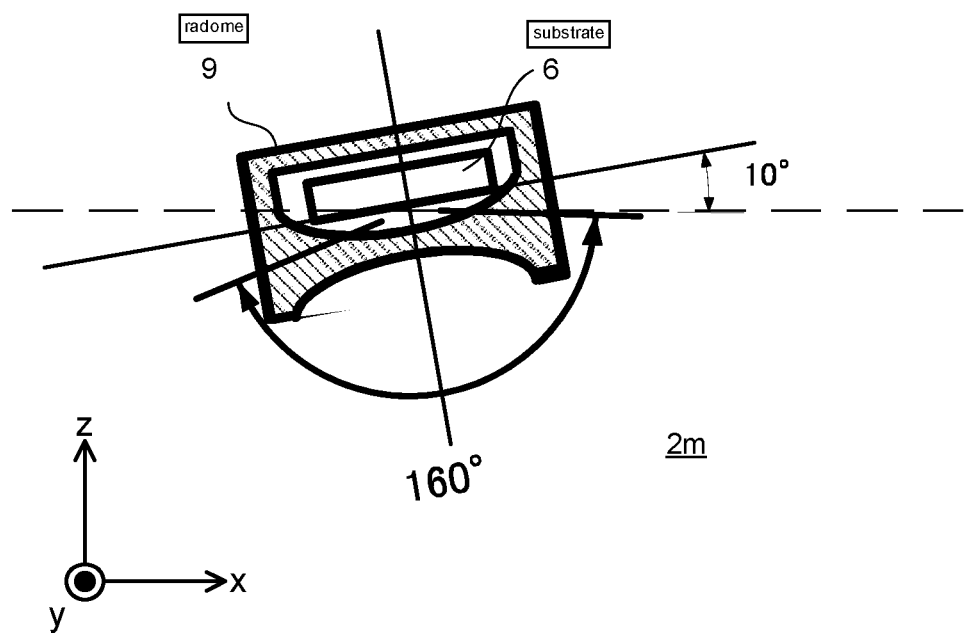
FIG. 26 is a schematic sectional view of a radar apparatus that is an example of a radar apparatus according to a modification of Embodiment 5.

FIG. 26 is a schematic sectional view of radar apparatus 2m, which is another example of the radar apparatus according to Embodiment 5. In radar system 3 illustrated in FIGS. 23, 24, and 25, the radiation direction of radar apparatus 2 is a direction that is substantially horizontal to the ceiling. For example, when radar apparatus 2 has a viewing angle of 160°, radar apparatus 2 is inclined in the positive direction of the z axis at an angle of 10°, thereby horizontally radiating a radar signal to the rear of radar apparatus 2.

As described above, with the use of a reflector, even one radar apparatus can detect occupants in three rows of seats.

Embodiment 6

This embodiment describes switching between a mode (object sensing mode) of sensing the presence of an object (occupant) and a mode (living-object sensing mode) of sensing a fine movement caused by a heartbeat and the like. In the foregoing embodiments, description has been made on the assumption that the target detected by a radar apparatus is an occupant. In this embodiment, a determination is made of whether the target detected by a radar apparatus is a load or a living object, and a radar apparatus is described as sensing an object.

Figure 27:
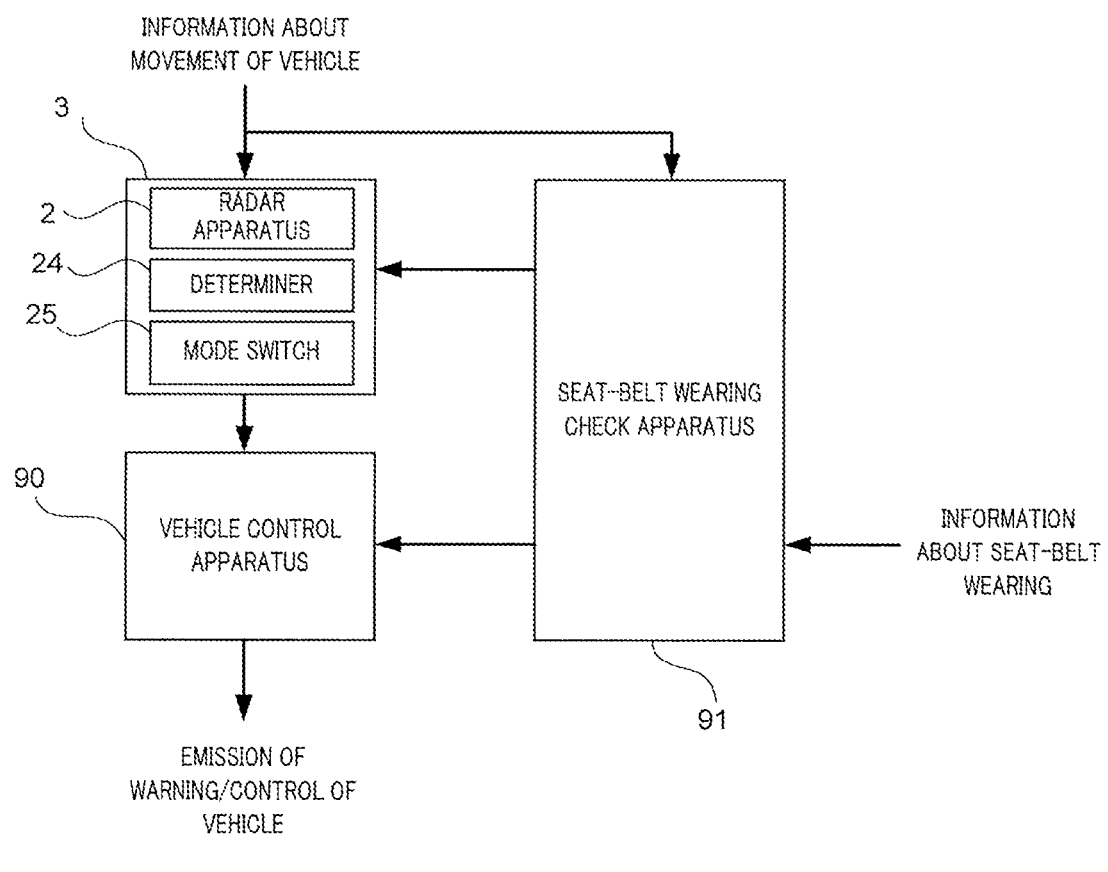
FIG. 27 is a diagram illustrating an example configuration of a vehicle control system according to Embodiment 6.
Figure 28:
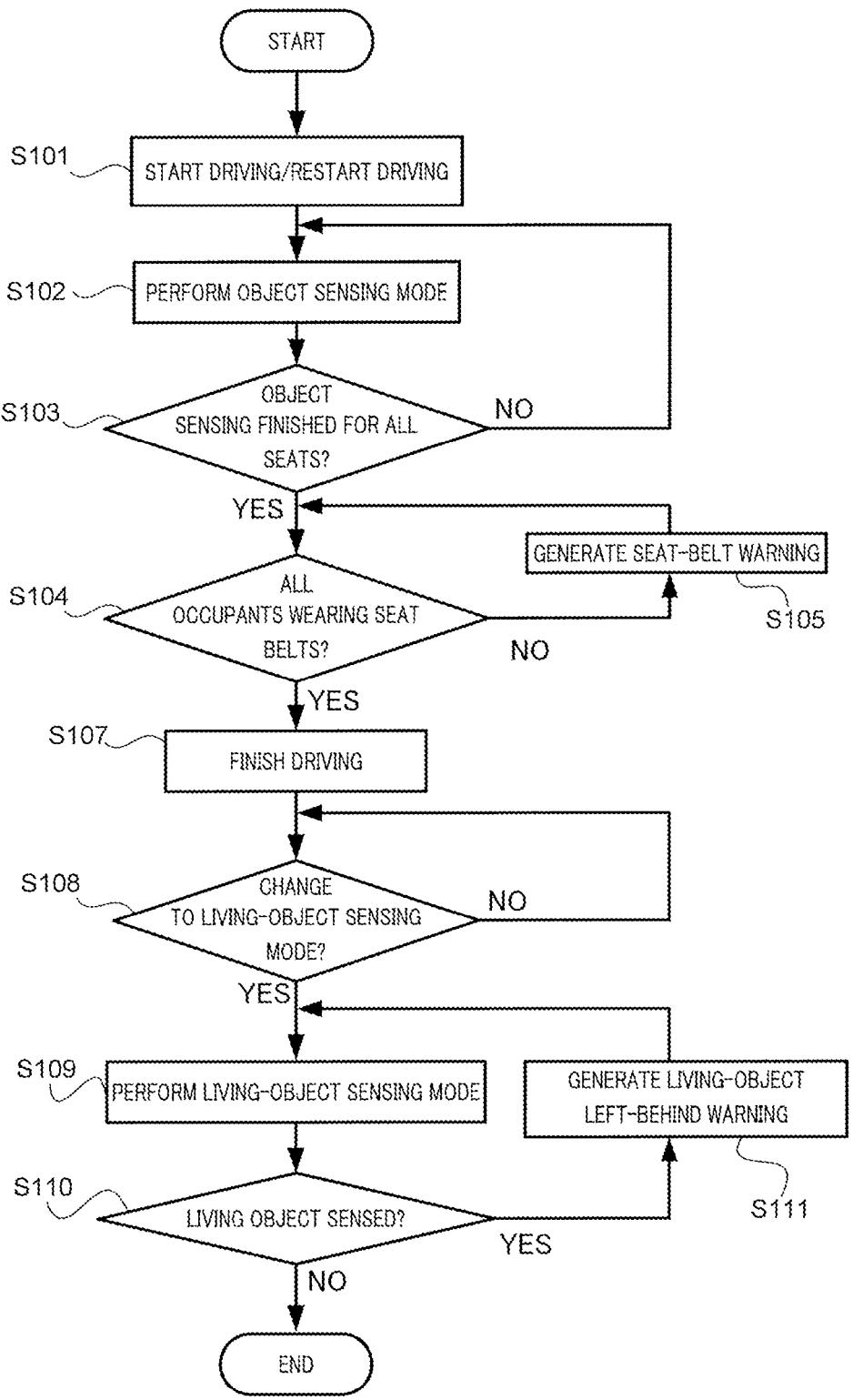
FIG. 28 is a flowchart illustrating an example operation of the vehicle control system according to Embodiment 6.

FIG. 27 is a diagram illustrating a configuration of vehicle control system 92 according to Embodiment 6. FIG. 28 is a flowchart illustrating an example operation of vehicle control system 92 according to Embodiment 6.

Vehicle control system 92 includes radar system 3, vehicle control apparatus 90, and seat-belt wearing check apparatus 91. Radar system 3 includes one or more radar apparatuses 2 described in the other embodiments, mode switch 25 that switches between the object sensing mode and the living-object sensing mode, and determiner 24 that determines whether the object sensed by radar apparatus 2 in the living-object sensing mode is a living object. Radar system 3 determines the presence or absence of a load in a vehicle or the presence or absence of a living object in the vehicle.

Vehicle control apparatus 90 emits a warning to the driver on a display (not illustrated) using an output signal of radar apparatus 2 and an output signal of seat-belt wearing check apparatus 91 or controls, for example, a light, a door lock, a communication apparatus, and an air-conditioning apparatus installed in the vehicle, which are not illustrated, using an output signal of radar apparatus 2 and an output signal of seat-belt wearing check apparatus 91.

Seat-belt wearing check apparatus 91 outputs a signal indicating a determination of whether a tongue plate of each seat belt (not illustrated) has been inserted into its corresponding buckle.

First, mode switch 25 receives, as information about movement of the vehicle, information indicating that the engine has been started after occupants have entered the vehicle (start of driving) or receives, during movement of the vehicle, information indicating no change in the number of occupants when the vehicle is at a standstill such as at an intersection stop light or because of a traffic jam (restart of driving) (S101). Then, mode switch 25 outputs to vehicle control apparatus 90 that radar system 3 operates in the object sensing mode.

Radar apparatus 2 outputs a radar signal and receives a reflected wave to determine whether an object is present in each seat (S102). If radar apparatus 2 detects the presence of an object (YES in S103) and seat-belt wearing check apparatus 91 detects that a seat belt is not worn (NO in S104), vehicle control apparatus 90 generates a seat-belt warning (S105).

Vehicle control apparatus 90 may not check whether a seat belt is worn for a seat in which no object is present. That is, vehicle control apparatus 90 performs the object sensing mode until a determination as to whether to generate a seat-belt warning is finished for all the seats (NO in S103).

The object sensing mode is a mode of sensing the presence or absence of an object, and even a large load or the like is not distinguished from an occupant (living object). Accordingly, when the vibration of the vehicle is weak, such as before the vehicle starts or when the vehicle is at a standstill such as at an intersection stop light or because of a traffic jam, mode switch 25 switches from the object sensing mode to the living-object sensing mode and observes a fluctuation of the complex signal component of a reflected wave output from radar apparatus 2 for several tens of seconds, for example, at the distance and angle at which an object is present.

If the fluctuation is regular and periodic and indicates a fluctuating period that is regarded as breathing or heartbeat of a person, determiner 24 determines that the object is a living object. If the conditions described above are not satisfied, determiner 24 may regard the object as a load and output a signal to vehicle control apparatus 90 to perform control not to generate a warning.

When the engine of the vehicle stops and at least one or more occupants release their seat belts, seat-belt wearing check apparatus 91 notifies radar system 3 and vehicle control apparatus 90 of the result of determination that the vehicle has arrived at the destination or the like and that at least one or more occupants have exited the vehicle (finish of driving) (S107).

Mode switch 25 determines whether to switch to the living-object sensing mode on the basis of information from seat-belt wearing check apparatus 91 about the vehicle (S108). If radar apparatus 2 senses a change in the number of sensed objects (YES in S108), radar system 3 performs the living-object sensing mode (S109). The change in the number of sensed objects includes a case where the number of objects is not changed as a result of decreasing the number of objects and then increasing the number of objects.

If determiner 24 detects a fine movement resulting from heartbeat, breathing, and so on (YES in S110), determiner 24 determines that an occupant or a pet (living object) is left in the passenger compartment, and notifies vehicle control apparatus 90 of the result.

Vehicle control apparatus 90 generates a left-behind warning in accordance with the notification result (S111). Examples of the left-behind warning include the blinking of a light, the releasing of a door lock, and the transmission of email to a smartphone (communication apparatus). If determiner 24 senses no living object in the living-object sensing mode (NO in S110), determiner 24 determines that no living object is left behind in the vehicle, and vehicle control system 92 ends the process.

If determiner 24 determines that all the occupants left in the passenger compartment are children, vehicle control system 92 notifies vehicle control apparatus 90 of information about a left-behind warning. If the occupants left in the passenger compartment include an adult occupant, vehicle control system 92 may not notify vehicle control apparatus 90 of information about the warning. Here, determiner 24 may determine an object sensed by radar apparatus 2 in the living-object sensing mode also by taking into consideration the size of the object, and may determine that the object is an adult living object when the size of the object is greater than or equal to a predetermined size.

Vehicle control apparatus 90 may also not perform warning when the occupants left in the passenger compartment include an occupant (living object) in the driver's seat. The occupant in the driver's seat is an occupant (living object) seated in the driver's seat from when the vehicle starts its movement to when the vehicle comes to a standstill.

Embodiment 7

Figure 29:
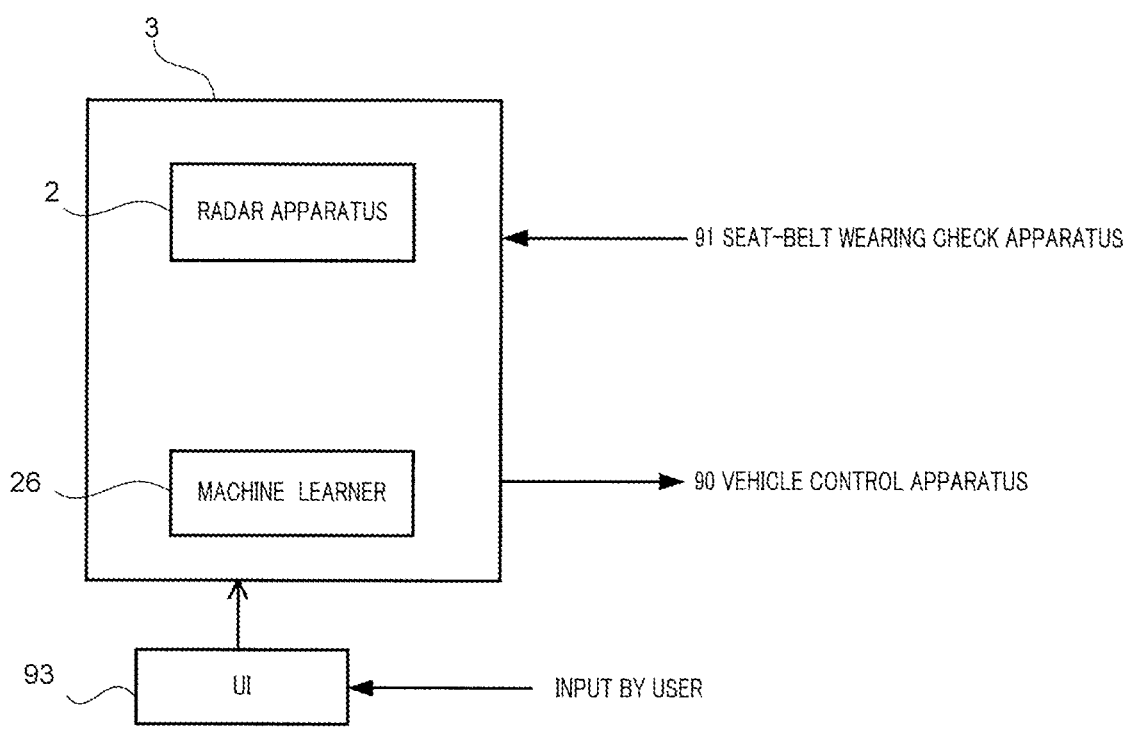
FIG. 29 is a diagram illustrating an example configuration of a radar system according to Embodiment 7.

This embodiment describes a radar system having a configuration in which the correctness of a result of sensing an object is fed back to an occupant and is utilized to update training data, thereby improving sensing performance. FIG. 29 is a diagram illustrating an example configuration of a radar system according to Embodiment 7.

Radar system 3 includes machine learner 26. Machine learner 26 compares the output of radar apparatus 2 with stored training data and determines whether the output of radar apparatus 2 indicates an occupant rather than noise. Within the output of radar apparatus 2, data similar to training data may be accumulated as new training data. When there is a plurality of pieces of training data, a piece of training data that is not similar to the output of radar apparatus 2 may be deleted from machine learner 26 for a predetermined period. Further, machine learner 26 may add a weight to each of the plurality of pieces of training data in accordance with the actual comparison result of the training data for a predetermined period to add the confidence level of the training data.

In FIG. 29, determiner 24 and mode switch 25 illustrated in FIG. 27 are not illustrated. When radar system 3 illustrated in FIG. 29 is used in vehicle control system 92 illustrated in FIG. 27, determiner 24 and mode switch 25 can be additionally provided. In addition, machine learning may also be applied to the output of determiner 24.

Next, the machine learning operation will be described. First, in response to the output of radar apparatus 2, machine learner 26 erroneously determines that an occupant is seated in a seat (for example, the front passenger's seat) in which no occupant is actually seated. Seat-belt wearing check apparatus 91 outputs to vehicle control apparatus 90 a signal indicating, for each of the seats, whether the seat belt is worn (e.g., the seat belt for the front passenger's seat is not worn).

Vehicle control apparatus 90 generates a wrong warning, indicating that "an occupant is seated in the front passenger's seat, but is not wearing the seat belt", from the determination result from radar system 3 and the signal from seat-belt wearing check apparatus 91. The occupant (for example, the driver) corrects the sensing result of radar system 3 through user interface (UI) 93, for example, through a screen of a car navigation system. Thereafter, machine learner 26 can delete the training data used in the current determination or reduce the confidence level.

On the other hand, if there is no feedback to UI 93 from the occupant, radar system 3 determines that occupants are correctly sensed. Then, radar system 3 uses the sensing result as training data and accumulates the sensing result in a memory of machine learner 26.

If a load is in a seat in which a radar apparatus senses an occupant, a correction may be made, indicating that the object in the seat is a (non-living) load, instead of a simple correction being made, simply indicating the wrong result. Accordingly, a radar system sets training data indicating a case where a simple mistake has been made because of no fine movement caused by a breathing or heartbeat and where an object itself has been correctly sensed. To reduce the erroneous determination described above, the object sensing mode may be regularly changed to the living-object sensing mode, and a determination may be made of whether an object present in a seat is a living object or a load.

Additionally, it is also preferable that, after confirming that no occupant is left in the vehicle, a user access vehicle control system 92 from outside the vehicle by using, for example, a smartphone or the like to cause a radar system to perform the object sensing mode and the living-object sensing mode to learn a reference signal for non-presence of an occupant.

OTHER EMBODIMENTS

Radar apparatus 2 or radar systems 3a and 3b according to Embodiments 1 to 7 have been described, taking as an example a seat arrangement including two rows of seats, namely, front seat 51 and rear seat 52. However, in a seat arrangement including three rows of seats, Embodiments 1 to 7 may be applied to, for example, the first-row seat and the second-row seat, or Embodiments 1 to 7 may be applied to the second-row seat and the third-row seat. The same applies to four or more rows of seats.

Radar apparatus 2 according to Embodiments 1 to 7 is arranged in backrest 19. Alternatively, radar apparatus 2 may be installed in a headrest (not illustrated) coupled to backrest 19.

In the embodiments described above, the term "section" used to indicate each constituent element may be interchangeably referred to as any other term such as "circuit (circuitry)", "device", "unit", or "module".

While various embodiments have been described with reference to the drawings, it goes without saying that the present disclosure is not limited to the foregoing examples. It is obvious that a person skilled in the art can conceive various modifications or variations within the scope set forth in the claims, and it is understood that such modifications or variations also fall within the technical scope of the present disclosure, as a matter of course. Further, any constituent elements in the embodiments described above may be combined as appropriate without departing from the spirit of the present disclosure.

The present disclosure can be implemented by software, hardware, or software in cooperation with hardware. Each functional block used in the description of the embodiments described above may be partly or entirely implemented as a large-scale integration (LSI), which is an integrated circuit, and each process described in the embodiments described above may be controlled partly or entirely by a single LSI or a combination of LSIs. LSIs may be formed as individual chips or may be formed as a single chip so as to include some or all of the functional blocks. The LSI may include a data input and output. The LSI may be referred to as an IC, a system LSI, a super LSI, or an ultra LSI depending on a difference in the degree of integration. The technique of forming an integrated circuit is not limited to the LSI and may be implemented by using a dedicated circuit, a general-purpose processor, or a special-purpose processor. In addition, a field programmable gate array (FPGA), which is programmable after the manufacture of the LSI, or a reconfigurable processor in which the connections and the settings of circuit cells inside the LSI can be reconfigured may be used. The present disclosure may be implemented as digital processing or analog processing. If integrated circuit technology replaces LSI as a result of the advancement of semiconductor technology or other derivative technology, it goes without saying that the functional blocks may be integrated using the integrated circuit technology.

The present disclosure can be implemented as any type of apparatus, device, and system (these are collectively referred to as communication apparatuses) having communication functions. Non-limiting examples of the communication apparatuses include phones (such as mobile phones and smartphones), tablet computers, personal computers (PCs) (such as laptop, desktop, and notebook PCs), cameras (such as digital still/video cameras), digital players (such as digital audio/video players), wearable devices (such as wearable cameras, smartwatches, and tracking devices), game consoles, digital book readers, telehealth and telemedicine (remote healthcare and medicine prescription) devices, vehicles or transport systems (such as automobiles, airplanes, and ships) with communication functions, and any combination of the various apparatuses described above.

The communication apparatuses are not limited to portable or movable communication apparatuses and include any type of apparatus, device, and system that are non-portable or fixed. Examples of such communication apparatuses include smart home devices (such as household electrical and electronic equipment, lighting equipment, smart meters, and measurement equipment, and control panels), vending machines, and other "things" that may exist on Internet of Things (IoT) networks.

Communication includes data communication using cellular systems, wireless local-area network (LAN) systems, and communication satellite systems, and data communication using a combination of these systems. The communication apparatuses also include devices such as controllers and sensors connected or coupled to communication devices that execute the communication functions described in the present disclosure. For example, the communication apparatuses include controllers and sensors that generate control signals or data signals used by communication devices that execute communication functions of the communication apparatuses.

The communication apparatuses further include infrastructure equipment that communicates with the various non-limiting apparatuses described above or that controls the various apparatuses. Examples of the infrastructure equipment include base stations, access points, and other apparatuses, devices, and systems.

A radar apparatus according to an embodiment of the present disclosure includes an antenna configured to radiate a first electromagnetic wave in a first radiation angle range including a first direction and radiates a second electromagnetic wave in a second radiation angle range including a second direction opposite to the first direction, and a circuit configured to detect a first target in the first direction and a second target in the second direction on the basis of a first reflected signal of the first electromagnetic wave and a second reflected signal of the second electromagnetic wave, the first reflected signal and the second reflected signal being received by the antenna.

In the radar apparatus according to the embodiment of the present disclosure, the radar apparatus is provided in a first seat in an indoor space; and the first direction is directed in a forward direction relative to a backrest portion of the first seat, and the second direction is directed in a backward direction relative to the backrest portion of the first seat in the indoor space.

In the radar apparatus according to the embodiment of the present disclosure, the circuit includes a memory that stores the first reflected signal and the second reflected signal in absence of the first target and the second target, and the circuit is configured to detect the first target and the second target on the basis of a difference between the first reflected signal received by the antenna and the first reflected signal stored in the memory and a difference between the second reflected signal received by the antenna and the second reflected signal stored in the memory.

In the radar apparatus according to the embodiment of the present disclosure, the circuit is configured to detect the first target and the second target on the basis of at least one of body movement, heartbeat, or breathing indicated by the first reflected signal and at least one of body movement, heartbeat, or breathing indicated by the second reflected signal.

In the radar apparatus according to the embodiment of the present disclosure, the circuit is configured to determine whether each of the first target and the second target is detectable, on the basis of a reflected signal from a reference indicator arranged in the indoor space in accordance with arrangement of the first seat and the second seat.

In the radar apparatus according to the embodiment of the present disclosure, the circuit is configured to determine whether each of the first target and the second target is detectable, on the basis of a detection result of at least one of an angle sensor that detects a reclining angle of the first seat and/or a position sensor that detects a sliding position of the first seat in a forward or backward direction.

In the radar apparatus according to the embodiment of the present disclosure, the antenna includes a first antenna element group arranged on a first surface of a substrate, and the first direction is a direction extending in a direction normal to the first surface.

In the radar apparatus according to the embodiment of the present disclosure, a portion of the substrate where the first antenna element group is provided has a smaller thickness than a rest of the substrate.

In the radar apparatus according to the embodiment of the present disclosure, the substrate includes a wave director on a second surface thereof, the second surface being a surface of the substrate opposite to the first surface.

In the radar apparatus according to the embodiment of the present disclosure, the antenna includes a second antenna element group arranged on a second surface of the substrate, the second surface being a surface of the substrate opposite to the first surface.

In the radar apparatus according to the embodiment of the present disclosure, the number of antenna elements in the first antenna element group is different from the number of antenna elements in the second antenna element group.

A vehicle according to an embodiment of the present disclosure includes the radar apparatus according to the embodiment of the present disclosure, and a seat including a backrest portion and a headrest portion. The antenna of the radar apparatus is provided in the backrest portion or the headrest portion. A radiation direction of the first electromagnetic wave is directed in a forward direction relative to the backrest portion or the headrest portion, and a radiation direction of the second electromagnetic wave is directed in a backward direction relative to the backrest portion or the headrest portion.

INDUSTRIAL APPLICABILITY

The present disclosure is suitable for use in an occupant detection sensor in a passenger compartment of a vehicle.

REFERENCE SIGNS LIST 2 (2a to 2m) Radar apparatus
3 (3a to 3L) Radar system
4 Sunroof
6 Substrate
7 Antenna
8 Radar chip
9 Radome
10 Cavity
11, 12 Electromagnetic beam
13 Wave director
14 Via
15 Wiring
16 Reflecting plate
17 Antenna element
18 Angle sensor
19 Backrest of seat
20 Reference mark
21 Radio-wave absorber
22 Reference mark
24 Determiner
25 Mode switch
26 Machine learner
27 Antenna
27a to 27n Antenna element 31 First direction
32 Second direction
41, 42 Occupant
51 Front seat
52 Rear seat
72 Antenna
80, 81, 82, 83, 84, 85, 86, 87, 88, 89, 80a, 80b, 80c, 80d Reflector
90 Vehicle control apparatus
91 Seat-belt wearing check apparatus
92 Vehicle control system
93 UI

What is claimed is:

1. An object detection apparatus in a vehicle, the object detection apparatus comprising:
one or more sensors configured to detect at least one object located on at least three rows of seats in the vehicle, each of the one or more sensors being positioned on a ceiling above at least one of the at least three rows of seats in the vehicle but not above all of the at least three rows of seats; and
a circuit configured to determine whether or not the at least one object detected is a living-object,
wherein a number of the one or more sensors is less than a number of the at least three rows of seats.

2. The object detection apparatus according to claim 1, wherein the circuit is further configured to determine either a start of driving of the vehicle, a restart of driving of the vehicle, and an end of driving of the vehicle, and
wherein
when the circuit determines that the start of driving of the vehicle or the restart of driving of the vehicle, the circuit instructs the one or more sensors to operate in an object sensing mode to detect a presence or an absence of the at least one object, and
when the circuit determines that the end of driving of the vehicle, the circuit instructs the one or more sensors to operate in a living-object sensing mode to detect whether or not the at least one object is the living-object.

3. The object detection apparatus according to claim 1, wherein, when the circuit determines that the at least one object detected is the living-object,
the circuit instructs a vehicle control device connected to the vehicle to notify outside of the vehicle that the living-object is left in the vehicle.

4. The object detection apparatus according to claim 1, wherein
the one or more sensors include two sensors,
the at least three rows of seats include a first row of seats, a second row of seats and a third row of seats,
a first sensor of the two sensors detects the at least one object on the first row of seats and the second row of seats from the ceiling above the first row of seats, and
a second sensor of the two sensors detects the at least one object on the third row of seats from the ceiling above the third row of seats.

5. The object detection apparatus according to claim 1, wherein
the one or more sensors include two sensors,
the at least three rows of seats include a first row of seats, a second row of seats and a third row of seats,
a first sensor of the two sensors detects the at least one object on the first row of seats from the ceiling above the first row of seats, and
a second sensor of the two sensors detects the at least one object on the second row of seats and the third row of seats from the ceiling above the second row of seats.

6. The object detection apparatus according to claim 4, wherein the first sensor of the two sensors detects the at least one object on the first row of seats and the second row of seats from above a driver's seat in the first row of seats.

7. The object detection apparatus according to claim 1, wherein
the one or more sensors include one sensor, and
the one sensor has a maximum viewing angle of 160 degrees.

8. The object detection apparatus according to claim 5, wherein
the first sensor has a concave lens.

9. The object detection apparatus according to claim 5, wherein
the first sensor has multiple concave-convex lenses.

10. The object detection apparatus according to claim 1, wherein
the one or more sensors include one sensor,
the at least three rows of seats include a first row of seats, a second row of seats and a third row of seats,
the one sensor detects the at least one object on the first row of seats using reflected waves from a rear-view mirror or side-view mirrors, and
the one sensor detects the at least one object on the second row of seats and the third row of seats using direct waves from the ceiling above the second row of seats.

11. The object detection apparatus according to claim 7, wherein
the one sensor has a first direction that scans using a direct wave and a second direction that scans using a reflector, and the first direction is different from the second direction.

12. The object detection apparatus according to claim 1, wherein
the one or more sensors have a driving circuit that changes a sensing direction.

13. The object detection apparatus according to claim 1, wherein
the one or more sensors have a drive circuit that changes an installation position of the one or more sensors.

14. The object detection apparatus according to claim 1, wherein
the one or more sensors include one sensor, and
the one sensor detects the at least one object on a first row of seats among the at least three rows of seats using reflected waves that are reflected from a windshield of the vehicle.

15. The object detection apparatus according to claim 1, further comprising:
a reflector placed above a first row of seats among the at least three rows of seats,
wherein the one or more sensors include one sensor, and
the one sensor detects the at least one object located on the first row of seats using reflected waves from a reflector.

16. The object detection apparatus according to claim 1, wherein the at least three rows of seats include a first row of seats, a second row of seats and a third row of seats,
the object detection apparatus further comprises a reflector placed at a top of the third row of seats,
the one or more sensors include one sensor,
the one sensor detects the at least one object on the first row of seats and the second row of seats without using reflected waves from a reflector, and the one sensor detects the at least one object on the third row of seats using reflected waves from a reflector.

17. The object detection apparatus according to claim 1, wherein the at least three rows of seats include a first row of seats, a second row of seats and a third row of seats, the object detection apparatus further comprises one or more elongated reflectors are placed at an edge of the ceiling above the second row of seats and the third row of seats,
the one or more sensors include one sensor, and
the one sensor
- detects the at least one object located on the first row of seats by using a direct wave from the ceiling above the first row of seats, and
- detects the at least one object located on the second row of seats and the third row of seats by using a reflected wave that is reflected from the one or more elongated reflectors.

\* \* \* \* \*